United States Patent
Kimura et al.

(10) Patent No.: US 7,875,215 B2
(45) Date of Patent: Jan. 25, 2011

(54) NEAR-INFRARED-ABSORBING MATERIAL AND NEAR-INFRARED-ABSORBING FILTER

(75) Inventors: Keizo Kimura, Odawara (JP); Katsuyoshi Yamakawa, Odawara (JP); Osama Uchida, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/859,367

(22) Filed: Sep. 21, 2007

(65) Prior Publication Data

US 2008/0073626 A1    Mar. 27, 2008

(30) Foreign Application Priority Data

Sep. 22, 2006   (JP) .............................. 2006-257480

(51) Int. Cl.
*F21V 9/04* (2006.01)
*F21V 9/06* (2006.01)
*G02B 5/22* (2006.01)
*G02B 5/26* (2006.01)

(52) U.S. Cl. ................. 252/587; 548/427; 548/156; 546/181; 546/94; 544/350

(58) Field of Classification Search ............ 252/587; 430/617, 551; 548/427, 156; 546/181, 94; 544/350
See application file for complete search history.

(56) References Cited

U.S. PATENT DOCUMENTS

| | | | |
|---|---|---|---|
| 4,960,538 A | 10/1990 | Itoh et al. | |
| 5,024,926 A | 6/1991 | Itoh et al. | |
| 5,384,069 A * | 1/1995 | Yoshinaga et al. | 252/299.01 |
| 6,329,121 B2 * | 12/2001 | Obayashi et al. | 430/270.1 |
| 6,863,845 B2 * | 3/2005 | Saito et al. | 252/587 |
| 6,887,657 B2 * | 5/2005 | Seto et al. | 430/551 |
| 7,303,865 B2 * | 12/2007 | Yoshioka | 430/617 |

| | | | |
|---|---|---|---|
| 2004/0184173 A1 * | 9/2004 | Kobayashi et al. | 359/885 |

FOREIGN PATENT DOCUMENTS

| | | |
|---|---|---|
| JP | 204865 A | 1/1990 |
| JP | 110167350 A | 6/1999 |
| JP | 20010133624 A | 5/2001 |
| JP | 2001-294785 * | 10/2001 |
| JP | 20050181966 A | 7/2005 |

* cited by examiner

*Primary Examiner*—Ling-Siu Choi
*Assistant Examiner*—Bijan Ahvazi
(74) *Attorney, Agent, or Firm*—Sughrue Mion, PLLC

(57) ABSTRACT

The invention provides a near-infrared-absorbing material comprising at least one first compound selected from the group consisting of a singlet oxygen scavenger, a radical trapping agent and an antioxidant and at least one second compound represented by the following formula (II-1) or (II-2).

formula (II-1)

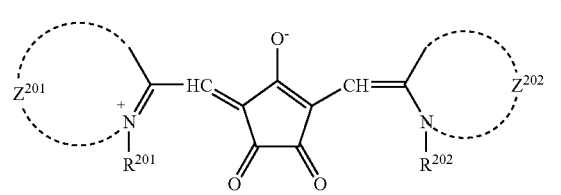

formula (II-2)

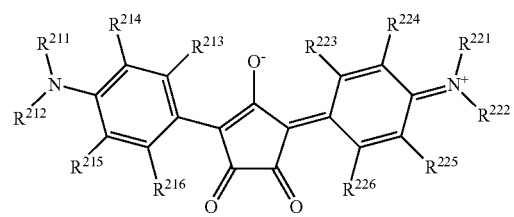

10 Claims, No Drawings

NEAR-INFRARED-ABSORBING MATERIAL AND NEAR-INFRARED-ABSORBING FILTER

CROSS-REFERENCES TO RELATED APPLICATIONS

This invention claims priority under 35 USC 119 from Japanese Patent Application Nos. 2006-257480, the disclosure of which is incorporated by reference herein.

BACKGROUND OF THE INVENTION

1. Field of the Invention

The present invention relates to a near-infrared-absorbing material and, in particular, to a near-infrared-absorbing material that plays an important role in optoelectronics-related products such as near-infrared-absorbing filters, near-infrared-absorbing colored resin compositions, liquid crystal display elements, optical cards, optical recording media, and protective goggles, as well as near-infrared-absorbing filters provided with the near-infrared-absorbing material.

2. Description of the Related Art

Near-infrared-absorbing dyes absorbing practically no visible light but absorbing infrared light have been used in various optoelectronic products such as near-infrared-absorbing filters. Depending on the mode of use, these optoelectronic products have suffered the problem of degradation when exposed to high-temperature, high-humidity or photo-irradiation, according to the application thereof. As a method of improving resistance to such conditions by changing the structure of the dyes, naphthalocyanine dyes having a specific structure (see, for example, Japanese Patent Application Laid-Open (JP-A) No. 2-4865, U.S. Pat. Nos. 4,960,538 and 5,024,926), for example, have been found to be excellent.

Alternatively, methods of suppressing photodegradation by combined use of a a near-infrared-absorbing dye and an ultraviolet-absorbing material are known (see, for example, JP-A Nos. 11-167350, 2001-133624, and 2005-181966).

However, it has been difficult for the naphthalocyanine dyes having a specific structure, described in JP-A Nos. 2-4865, U.S. Pat. Nos. 4,960,538 and 5,024,926 mentioned above, to satisfy absorption wavelength in addition to other physical properties such as solubility.

All of the methods described in JP-A Nos. 11-167350, 2001-133624, and 2005-181966 mentioned above are related to phthalocyanine compounds, diimonium compounds and the like, and since the degree of suppression of photodegradation by these compounds is insufficient, there has been a need for methods of further improvement in light resistance. As a near-infrared-absorbing dye, a compound having a croconium skeleton has not hitherto been reported as a powerful means for suppressing degradation.

SUMMARY OF THE INVENTION

The present invention has been made in view of the above circumstances and provides a near-infrared-absorbing material and a near-infrared-absorbing filter.

A first aspect of the invention provides a near-infrared-absorbing material comprising at least one first compound selected from the group consisting of a singlet oxygen scavenger, a radical trapping agent and an antioxidant and at least one second compound represented by the following formula (II-1) or (II-2):

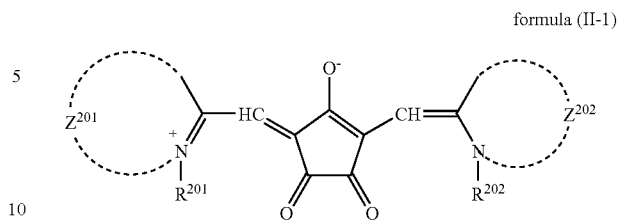

formula (II-1)

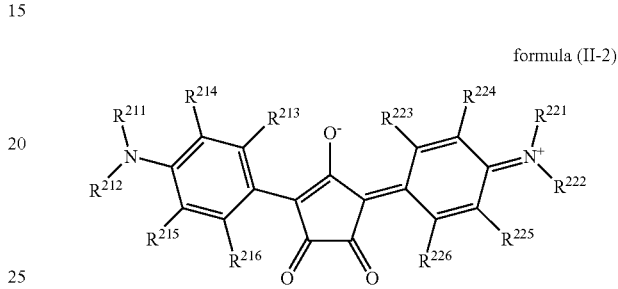

formula (II-2)

wherein $R^{201}$, $R^{202}$, $R^{211}$, $R^{212}$, $R^{221}$ and $R^{222}$ each independently represents a hydrogen atom, an aliphatic group, an aromatic group, or a heterocyclic group bound via a carbon atom; $Z^{201}$ and $Z^{202}$ each represents a nonmetallic atomic group necessary for forming a nitrogen-containing heterocycle; $R^{213}$ to $R^{216}$ and $R^{223}$ to $R^{226}$ each represents a hydrogen atom or a substituent group; and $R^{213}$ and $R^{214}$, $R^{214}$ and $R^{211}$, $R^{211}$ and $R^{212}$, $R^{212}$ and $R^{215}$, $R^{215}$ and $R^{216}$, $R^{223}$ and $R^{224}$, $R^{224}$ and $R^{221}$, $R^{221}$ and $R^{222}$, $R^{222}$ and $R^{225}$, and $R^{225}$ and $R^{226}$ may be bound to each other to form a ring.

DETAILED DESCRIPTION OF THE INVENTION

The object of the present invention is to provide a near-infrared-absorbing material that simultaneously achieves light resistance, near-infrared absorption performance, and less discoloration after light deterioration, as well as a near-infrared-absorbing filter provided with the near-infrared-absorbing material, and this problem is successfully achieved by the invention.

Hereinafter, embodiments of the invention are described in more detail.

<Near-Infrared-Absorbing Material>

The near-infrared-absorbing material of the invention comprises at least one first compound selected from the group consisting of a singlet oxygen scavenger, a radical trapping agent and an antioxidant (hereinafter referred to sometimes as compound (I)) and at least one second compound represented by formula (II-1) or (II-2) below (hereinafter referred to sometimes as compound (II)).

By incorporating at least the compound (I) and the compound (II), a near-infrared-absorbing material that simultaneously achieves light resistance, near-infrared absorption performance, and less discoloration after light deterioration can be constructed.

formula (II-1)

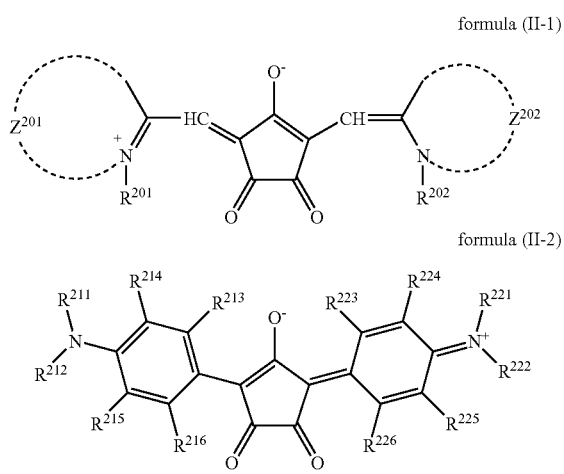

formula (II-2)

wherein $R^{201}$, $R^{202}$, $R^{211}$, $R^{212}$, $R^{221}$ and $R^{222}$ each independently represents a hydrogen atom, an aliphatic group, an aromatic group, or a heterocyclic group bound via a carbon atom; $Z^{201}$ and $Z^{202}$ each represents a nonmetallic atomic group necessary for forming a nitrogen-containing heterocycle; $R^{213}$ to $R^{216}$ and $R^{223}$ to $R^{226}$ each independently represents a hydrogen atom or a substituent group; and $R^{213}$ and $R^{214}$, $R^{214}$ and $R^{211}$, $R^{211}$ and $R^{212}$, $R^{212}$ and $R^{215}$, $R^{215}$ and $R^{216}$, $R^{223}$ and $R^{224}$, $R^{224}$ and $R^{221}$, $R^{221}$ and $R^{222}$, $R^{222}$ and $R^{225}$, and $R^{225}$ and $R^{226}$ may be bound to each other to form a ring.

In the invention, at least one kind of ultraviolet-absorbing compound is preferably further contained, and the spectral absorption maximum wavelength, in a range of from 270 to 1600 nm, of the ultraviolet-absorbing compound in solution is preferably 410 nm or less.

(Spectral Absorption Maximum Wavelength)

Now, the spectral absorption maximum wavelength is described.

The spectral absorption maximum wavelength is defined by an absorption spectrum of the compound in solution, and any solvent in which the compound is dissolved can be used. The solvent may be an organic or inorganic solvent or water or may be a mixed solvent thereof. In the invention, the spectral absorption maximum wavelength may be in a range defined in the invention under the temperature condition where the compound is dissolved in the solvent.

The organic solvent includes, for example, amide-based solvents (for example, N,N-dimethylformamide, N,N-dimethylacetamide, and 1-methyl-2-pyrrolidone), sulfone-based solvents (for example, sulfolane), sulfoxide-based solvents (for example, dimethyl sulfoxide), ureido-based solvents (for example, tetramethyl urea), ether-based solvents (for example, dioxane, tetrahydrofuran, and cyclopentyl methyl ether), ketone-based solvents (for example, acetone and cyclohexanone), hydrocarbon-based solvents (for example, toluene, xylene, and n-decane), halogen-based solvents (for example, tetrachloroethane, chlorobenzene, and chloronaphthalene), alcohol-based solvents (for example, methanol, ethanol, isopropyl alcohol, ethylene glycol, cyclohexanol, and phenol), pyridine-based solvents (for example, pyridine, γ-picoline, and 2,6-lutidine), ester-based solvents (for example, ethyl acetate and butyl acetate), carboxylic acid-based solvents (for example, acetic acid and propionic acid), nitrile-based solvents (for example, acetonitrile), sulfonic acid-based solvents (for example, methanesulfonic acid) and amine-based solvents (for example, triethylamine and tributylamine). The inorganic solvent includes, for example, sulfuric acid and phosphoric acid.

Among these solvents, amide-based solvents, sulfone-based solvents, sulfoxide-based solvents, ureido-based solvents, ether-based solvents, ketone-based solvents, halogen-based solvents, alcohol-based solvents, ester-based solvents and nitrile-based solvents are preferably used in consideration of solubility in measurement of the spectral absorption maximum wavelength of the ultraviolet-absorbing compound.

The concentration of the compound when measured for its spectral absorption maximum wavelength may be any concentration at which the spectral absorption maximum wavelength can be confirmed; preferably, the concentration is in a range of $1 \times 10^{-13}$ to $1 \times 10^{-7}$ (mol/l). The temperature is not particularly limited and is preferably 0 to 80° C., most preferably room temperature (25° C.) unless the solubility of the compound is problematic.

As a measuring instrument for measuring the spectral absorption maximum wavelength, a usual spectral absorption measuring instrument (for example, U-4100 spectrophotometer manufactured by Hitachi High Technologies) can be used.

<Groups in the Invention>

The groups in the invention will be described in detail, before the compound is described.

The aliphatic group in the present specification means an alkyl group, a substituted alkyl group, an alkenyl group, a substituted alkenyl group, an alkynyl group, a substituted alkynyl group, an aralkyl group or a substituted aralkyl group. The alkyl group may be a branched or cyclic group. The number of carbon atoms in the alkyl group is preferably 1 to 20, more preferably 1 to 18. The alkyl unit in the substituted alkyl group is the same as the above alkyl group. The alkenyl group may be a branched or cyclic ring. The number of carbon atoms in the alkenyl group is preferably 2 to 20, more preferably 2 to 18. The alkenyl unit in the substituted alkenyl group is the same as the alkenyl group above. The alkynyl group may be a branched or cyclic group. The number of carbon atoms in the alkynyl group is preferably 2 to 20, more preferably 2 to 18. The alkynyl unit in the substituted alkynyl group is the same as the alkynyl group above. The alkyl unit in the aralkyl group and substituted aralkyl group is the same as the alkyl group above. The aryl unit in the aralkyl group and substituted aralkyl group is the same as the aryl group below.

Examples of the substituent groups in the substituted alkyl group, substituted alkenyl group, or substituted alkynyl group, or in the alkyl unit in the substituted aralkyl group include halogen atoms (such as chlorine, bromine, and iodine); alkyl groups [straight-chain, branched, or cyclic substituted or unsubstituted alkyl group; specific examples thereof include alkyl groups (preferably alkyl groups having 1 to 30 carbon atoms, such as methyl, ethyl, n-propyl, isopropyl, t-butyl, n-octyl, eicosyl, 2-chloroethyl, 2-cyanoethyl, and 2-ethylhexyl), cycloalkyl groups (preferably substituted or unsubstituted cycloalkyl groups having 3 to 30 carbon atoms, such as cyclohexyl, cyclopentyl, and 4-n-dodecylcyclohexyl), bicycloalkyl groups (preferably substituted or unsubstituted bicycloalkyl groups having 5 to 30 carbon atoms, i.e., monovalent groups of bicycloalkanes having 5 to 30 carbon atoms from which a hydrogen atom is removed, such as bicyclo[1,2,2]heptan-2-yl and bicyclo[2,2,2]octan-3-yl), tricyclic structures having more ring structures, and the like; and the alkyl group in the substituent group described below (e.g., alkyl group in alkylthio group) is also the alkyl group in the same meaning]; alkenyl groups [straight-chain, branched, or cyclic substituted or unsubstituted alkenyl groups; alkenyl groups (including preferably substituted or unsubstituted alkenyl groups having 2 to 30 carbon atoms, such as vinyl, allyl, prenyl, geranyl, and oleyl), including cycloalkenyl groups (preferably, substituted or unsubstituted cycloalkenyl groups having 3 to 30 carbon atoms, i.e., monovalent groups of a cycloalkene having 3 to 30 carbon atoms from which a hydrogen atom is removed such as 2-cyclopenten-1-yl and 2-cylcohexen-1-yl), and bicycloalkenyl groups (substituted or unsubstituted bicycloalkenyl groups, preferably substituted or unsubstituted bicycloalkenyl groups having 5 to 30 carbon atoms, i.e., monovalent groups of a bicycloalkene having a double bond from which a hydrogen atom is removed, such as bicyclo[2,2,1]hept-2-en-1-yl and bicyclo[2,2,2]oct-2-en-4-yl)], alkynyl groups (preferably substituted or unsubstituted alkynyl groups having 2 to 30 carbon atoms, such as ethynyl, propargyl, and trimethylsilylethynyl), aryl groups (preferably substituted or unsubstituted aryl groups having 6 to 30 carbon atoms, such as phenyl, p-toluoyl, naphthyl, m-chlorophenyl, and o-hexadecanoylaminophenyl), heterocyclic groups (monovalent groups, preferably five- or six-membered substituted or unsubstituted, aromatic or nonaromatic heterocyclic compounds from which a hydrogen atom is removed, more preferably, five- or six-membered heteroaromatic ring groups having 3 to 30 carbon atoms, such as 2-furyl, 2-thienyl, 2-pyrimidinyl, and 2-benzothiazolyl), a cyano group, a hydroxyl group, a nitro group, a carboxyl group, alkoxy groups (preferably substituted or unsubstituted alkoxy groups having 1 to 30 carbon atoms, such as methoxy, ethoxy, isopropoxy, t-butoxy, n-octyloxy, and 2-methoxyethoxy), aryloxy groups (preferably substituted or unsubstituted aryloxy groups having 6 to 30 carbon atoms, such as phenoxy, 2-methylphenoxy, 4-t-butylphenoxy, 3-nitrophenoxy, and 2-tetradecanoylaminophenoxy), silyloxy groups (preferably silyloxy groups having 3 to 20 carbon atoms, such as trimethylsilyloxy and t-butyldimethylsilyloxy), heterocyclic oxy groups (preferably substituted or unsubstituted heterocyclic oxy groups having 2 to 30 carbon atoms, such as 1-phenyltetrazole-5-oxy and 2-tetrahydropyranyloxy), acyloxy groups (preferably formyloxy group, substituted or unsubstituted alkylcarbonyloxy groups having 2 to 30 carbon atoms, and substituted or unsubstituted arylcarbonyloxy groups having 6 to 30 carbon atoms, such as formyloxy, acetyloxy, pivaloyloxy, stearoyloxy, benzoyloxy, and p-methoxyphenylcarbonyloxy), carbamoyloxy groups (preferably substituted or unsubstituted carbamoyloxy group having 1 to 30 carbon atoms, such as N,N-dimethylcarbamoyloxy, N,N-diethylcarbamoyloxy, morpholinocarbonyloxy, N,N-di-n-octylaminocarbonyloxy, and N-n-octylcarbamoyloxy), alkoxycarbonyloxy groups (preferably substituted or unsubstituted alkoxycarbonyloxy groups having 2 to 30 carbon atoms, such as methoxycarbonyloxy, ethoxycarbonyloxy, t-butoxycarbonyloxy, and n-octylcarbonyloxy), aryloxycarbonyloxy groups (preferably substituted or unsubstituted aryloxycarbonyloxy group having 7 to 30 carbon atoms, such as phenoxycarbonyloxy, p-methoxyphenoxycarbonyloxy, and p-n-hexadecyloxyphenoxycarbonyloxy), amino groups (preferably an amino group, substituted or unsubstituted alkylamino groups having 1 to 30 carbon atoms, and substituted or unsubstituted anilino groups having 6 to 30 carbon atoms, such as amino, methylamino, dimethylamino, anilino, N-methyl-anilino, and diphenylamino), acylamino groups (preferably a formylamino group, substituted or unsubstituted alkylcarbonylamino groups having 1 to 30 carbon atoms, and substituted or unsubstituted arylcarbonylamino group having 6 to 30 carbon atoms, such as formylamino, acetylamino, pivaloylamino, lauroylamino, benzoylamino, and 3,4,5-tri-n-octyloxyphenylcarbonylamino), aminocarbonylamino groups (preferably substituted or unsubstituted aminocarbonylamino groups having 1 to 30 carbon atoms, such as carbamoylamino, N,N-dimethylaminocarbonylamino, N,N-diethylaminocarbonylamino, and morpholinocarbonylamino), alkoxycarbonylamino groups (preferably substituted or unsubstituted alkoxycarbonylamino groups having 2 to 30 carbon atoms, such as methoxycarbonylamino, ethoxycarbonylamino, t-butoxycarbonylamino, n-octadecyloxycarbonylamino, and N-methylmethoxycarbonylamino), aryloxycarbonylamino groups (preferably, substituted or unsubstituted aryloxycarbonylamino groups having 7 to 30 carbon atoms, such as phenoxycarbonylamino, p-chlorophenoxycarbonylamino, and m-n-octyloxyphenoxycarbonylamino), sulfamoylamino groups (preferably substituted or unsubstituted sulfamoylamino group having 0 to 30 carbon atoms, such as sulfamoylamino, N,N-dimethylaminosulfonylamino, and N-n-octylaminosulfonylamino), alkyl and arylsulfonylamino groups (preferably substituted or unsubstituted alkylsulfonylamino groups having 1 to 30 carbon atoms and substituted or unsubstituted arylsulfonylamino groups having 6 to 30 carbon atoms, such as methylsulfonylamino, butylsulfonylamino, phenylsulfonylamino, 2,3,5-trichlorophenylsulfonylamino, and p-methylphenylsulfonylamino), a mercapto group, alkylthio groups (preferably substituted or unsubstituted alkylthio group having 1 to 30 carbon atoms, such as methylthio, ethylthio, and n-hexadecylthio), arylthio groups (preferably substituted or unsubstituted arylthio groups having 6 to 30 carbon atoms, such as phenylthio, p-chlorophenylthio, and m-methoxyphenylthio), heterocyclic thio groups (preferably substituted or unsubstituted heterocyclic thio groups having 2 to 30 carbon atoms, such as 2-benzothiazolylthio and 1-phenyltetrazol-5-ylthio), sulfamoyl groups (preferably substituted or unsubstituted sulfamoyl groups having 0 to 30 carbon atoms, such as N-ethylsulfamoyl, N-(3-dodecyloxypropyl)sulfamoyl, N,N-dimethylsulfamoyl, N-acetylsulfamoyl, N-benzoylsulfamoyl, and N—(N'-pheylcarbamoyl) sulfamoyl), a sulfo group, alkyl- or aryl-sulfinyl groups (preferably, substituted or unsubstituted alkylsulfinyl groups having 1 to 30 carbon atoms and substituted or unsubstituted arylsulfinyl group having 6 to 30 carbon atoms, such as methylsulfinyl, ethylsulfinyl, phenylsulfinyl, and p-methylphenylsulfinyl), alkyl or arylsulfonyl groups (preferably substituted or unsubstituted alkylsulfonyl groups having 1 to 30 carbon atoms and substituted or unsubstituted arylsulfonyl groups having 6 to 30 carbon atoms, such as methylsulfonyl, ethylsulfonyl, phenylsulfonyl, and p-methylphenylsulfonyl), acyl groups (preferably a formyl group, substituted or unsubstituted alkylcarbonyl groups having 2 to 30 carbon atoms, substituted or unsubstituted aryloxycarbonyl groups having 7 to 30 carbon atoms, and heterocyclic carbonyl groups having a carbonyl group bound to a substituted or unsubstituted carbon group having 4 to 30 carbon atoms, such as acetyl, pivaloyl, 2-chloroacetyl, stearoyl, benzoyl, p-n-octyloxyphenylcarbonyl, 2-pyridylcarbonyl, and 2-furylcarbonyl), aryloxycarbonyl groups (preferably substituted or unsubstituted aryloxycarbonyl groups having 7 to 30 carbon atoms, such as phenoxycarbonyl, o-chlorophenoxycarbonyl, m-nitrophenoxycarbonyl, and p-t-butylphenoxycarbonyl), alkoxycarbonyl groups (preferably substituted or unsubstituted alkoxycarbonyl groups having 2 to 30 carbon atoms, such as methoxycarbonyl, ethoxycarbonyl, t-butoxycarbonyl, and n-octadecyloxycarbonyl), carbamoyl groups (preferably substituted or unsubstituted carbamoyl groups having 1 to 30 carbon atoms, such as carbamoyl, N-methylcarbamoyl, N,N-dimethylcarbamoyl, N,N-di-n-octylcarbamoyl, and N-(methylsulfonyl)carbamoyl), aryl or heterocyclic azo groups (preferably substituted or unsubstituted aryl azo groups having 6 to 30 carbon atoms and substituted or unsubstituted heterocyclic azo groups having 3 to 30 carbon atoms, such as phenylazo, p-chlorophenylazo, and 5-ethylthio-1,3,4-thiadiazol-2-ylazo), imido groups (preferably, N-succinimido and N-phthalimido), phosphino groups (preferably substituted or unsubstituted phosphino groups having 2 to 30 carbon atoms, such as dimethylphosphino, diphenylphosphino, and methylphenoxyphosphino), phosphinyl groups (preferably substituted or unsubstituted phosphinyl groups having 2 to 30 carbon atoms, such as phosphinyl, dioctyloxyphosphinyl, and diethoxyphosphinyl), phosphinyloxy groups (preferably substituted or unsubstituted phosphinyloxy groups having 2 to 30 carbon atoms, such as diphenoxyphosphinyloxy and dioctyloxyphosphinyloxy), phosphinylamino groups (preferably substituted or unsubstituted phosphinylamino groups having 2 to 30 carbon atoms, such as dimethoxyphosphinylamino and dimethylaminophosphinylamino), silyl groups (preferably substituted or unsubstituted silyl groups having 3 to 30 carbon atoms, such as trimethylsilyl, t-butyldimethylsilyl, and phenyldimethylsilyl), and the like.

The functional groups above containing hydrogen atoms may be removed of its hydrogen atoms and substituted with one of the groups above. Examples of the functional groups include alkylcarbonylaminosulfonyl groups, arylcarbonylaminosulfonyl groups, alkylsulfonylaminocarbonyl groups, and arylsulfonylaminocarbonyl groups. Specific examples thereof include groups such as methylsulfonylaminocarbonyl, p-methylphenylsulfonylaminocarbonyl, acetylaminosulfonyl, and benzoylaminosulfonyl.

Substituent groups to the aryl unit in the substituted aralkyl group include the substituent groups to the following substituted aryl group.

The aromatic group in the present specification means an aryl group or a substituted aryl group. These aromatic groups may be fused with an aliphatic ring, another aromatic ring or a hetero ring. The number of carbon atoms in the aromatic group is preferably 6 to 40, more preferably 5 to 30, and still more preferably 6 to 20. Among them, the aryl group is particularly preferably a phenyl or naphthyl group that may have substituent, particularly preferably a phenyl group that may have substituent.

Examples of the substituent groups of the substituted aryl group include those described as the "substituent groups of the alkyl unit in the substituted alkyl group, substituted alkenyl group, substituted alkynyl group, and of substituted aralkyl group" described above.

In the invention, the heterocyclic group preferably contains a 5- or 6-membered saturated heterocycle. An aliphatic ring, an aromatic ring or another heterocycle may be fused with the heterocycle. Examples of a heteroatom in the heterocycle include B, N, O, S, Se and Te. The heteroatom in the heterocycle is particularly preferably N, O or S. Preferably, a carbon atom in the heterocycle has a free atomic valence (monovalent) (heterocyclic group is bound via this carbon atom). The number of carbon atoms in the heterocyclic group is preferably 1 to 40, more preferably 1 to 30, still more preferably 1 to 20. Examples of the saturated heterocycle include a pyrrolidine ring, morpholine ring, 2-bora-1,3-dioxolane ring, and 1,3-thiazolidine ring. Examples of the unsaturated heterocycle include an imidazole ring, thiazole ring, benzothiazole ring, benzoxazole ring, benzotriazole ring, benzoselenazole ring, pyridine ring, pyrimidine ring and quinoline ring. The heterocyclic group may have substituent groups. Examples of such substituent groups include those described as the "substituent groups of the alkyl unit in the substituted alkyl group, substituted alkenyl group, substituted alkynyl group, and of substituted aralkyl group" described above.

(A Singlet Oxygen Scavenger, a Radical Trapping Agent and an Antioxidant)

The near-infrared-absorbing material of the invention contains at least one first compound selected from a singlet oxygen scavenger, a radical trapping agent and an antioxidant.

The singlet oxygen scavenger, the radical trapping agent and the antioxidant in the invention may be any materials that capture singlet oxygen, trap radicals or prevent oxidation, and examples of such materials include Seesorb 612 NH (Shipro Co., Ltd.), organic nickel compounds such as Irgastab 2002 (Ciba Specialty Chemicals), hindered amine compounds such as Tinuvin 744 (Ciba Specialty Chemicals), phenol compounds such as Irganox 1076 (Ciba Specialty Chemicals), amine compounds such as Sumilizer 9A (Sumitomo Chemical Co., Ltd.,) sulfur compounds such as Sumilizer TPM (Sumitomo Chemical Co., Ltd.), and phosphorus compounds such as Sumilizer TPPR (Sumitomo Chemical Co., Ltd.), and these can be used alone or as a mixture thereof or may be used in combination of an ultraviolet-absorbing compound described later. The total amount of these materials used as the compound (I) is preferably 0.01 to 10 moles, more preferably 0.05 to 7 moles, still more preferably 0.1 to 5 moles, further more preferably 0.1 to 2 moles, even more preferably 0.1 to 0.5 mole, per mole of the compound (II). When the content of the compound (I) is in these ranges, light resistance can be more effectively improved, and near-infrared absorption performance and less discoloration after light deterioration can be simultaneously easily achieved.

In the invention, the compound (I) is preferably a compound represented by the following formula (I-1) or (I-2):

formula (I-1)

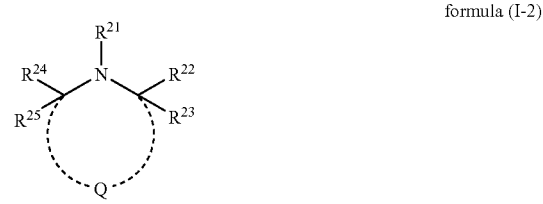

formula (I-2)

wherein $R^{11}$ represents a hydrogen atom, an aliphatic group, an aromatic group, a heterocyclic group bound via a carbon atom, or a hydrolysable protective group; $R^{12}$ to $R^{16}$ independently represent a hydrogen atom or a substituent group; $R^{11}$ and $R^{12}$, $R^{12}$ and $R^{13}$, $R^{13}$ and $R^{14}$, $R^{14}$ and $R^{15}$, $R^{15}$ and $R^{16}$, or $R^{16}$ and $R^{11}$ may be bound to each other to form a ring; $R^{21}$ represents a hydrogen atom, an aliphatic group, an acyl group, a sulfonyl group, a sulfinyl group, an oxy radical group or a hydroxyl group; Q represents a nonmetallic atomic group necessary for forming a 5-, 6- or 7-membered ring; $R^{22}$ to $R^{25}$ independently represent a hydrogen atom, an aliphatic group, an aromatic group, or a heterocyclic group bound via a carbon atom; and $R^{21}$ and $R^{22}$, $R^{22}$ and $R^{23}$, $R^{24}$ and $R^{25}$, or $R^{21}$ and $R^{24}$ may be bound to each other to form a ring.

The hydrolysable protective group is a silyl group, a phosphate group, or a group represented by the following formula (IV):

$$R^{111}-Y^{111}-Z^{111}- \qquad (IV)$$

wherein $R^{111}$ represents an aliphatic group, an aromatic group, or a heterocyclic group bound via a carbon atom; $Y^{111}$ represents a single bond, —O—, —S—, —N($R^{112}$)—, —CH$_2$—, or its bound group; $Z^{111}$ represents —CO— or —SO$_2$—; and $R^{112}$ represents a hydrogen atom, an aliphatic group, an aromatic group, a heterocyclic group bound via a carbon atom, an acyl group, or an alkyl or aryl sulfonyl group.

$R^{11}$ is preferably a hydrogen atom, an aliphatic group having 1 to 20 carbon atoms, an aromatic group having 6 to 20 carbon atoms, a heterocyclic group having 2 to 20 carbon atoms bound via a carbon atom, or a hydrolysable protective group having 1 to 20 carbon atoms, more preferably a hydrogen atom, an aliphatic group having 1 to 10 carbon atoms, or a hydrolysable protective group having 1 to 10 carbon atoms, still more preferably a hydrogen atom, an aliphatic group having 1 to 8 carbon atoms, a silyl group having 1 to 10 carbon atoms, a phosphate group having 1 to 10 carbon atoms, or a hydrolysable protective group having 1 to 10 carbon atoms bound via a carbonyl group, further more preferably a hydrogen atom, an aliphatic group having 1 to 4 carbon atoms, a silyl group having 3 to 6 carbon atoms, a phosphate group having 2 to 8 carbon atoms, or a hydrolysable protective group having 1 to 8 carbon atoms bound via a carbonyl group, even more preferably a hydrogen atom, a trimethylsilyl group, a dimethyl or diethyl phosphate group, a benzoyl group, or an acetyl group, most preferably a hydrogen atom.

Each of $R^{12}$ to $R^{16}$ is preferably a hydrogen atom, halogen atom, alkyl group, alkenyl group, alkynyl group, aryl group, cyano group, hydroxyl group, carboxyl group, alkoxy group, aryloxy group, silyloxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or aryl sulfonylamino group, mercapto group, alkylthio group, arylthio group, sulfamoyl group, sulfo group, alkyl or aryl sulfinyl group, alkyl or aryl sulfonyl group, acyl group, aryloxycarbonyl group, alkoxycarbonyl group, carbamoyl group, imido group, phosphino group, phosphinyl group, phosphinyloxy group, phosphinylamino group, or silyl group, more preferably a hydrogen atom, halogen atom, alkyl group, alkenyl group, aryl group, cyano group, hydroxyl group, carboxyl group, alkoxy group, aryloxy group, silyloxy group, acyloxy group, carbamoyloxy group, alkoxycarbonyloxy group, aryloxycarbonyloxy group, amino group, acylamino group, alkylthio group, arylthio group, acyl group, aryloxycarbonyl group, alkoxycarbonyl group, carbamoyl group, or silyl group, still more preferably a hydrogen atom, halogen atom, alkyl group, aryl group, hydroxyl group, alkoxy group, acyloxy group, acylamino group, carbamoyloxy group, or alkylthio group, further more preferably a hydrogen atom, halogen atom, alkyl group, hydroxyl group, alkoxy group, or acylamino group, most preferably a hydrogen atom or alkyl group. $R^{12}$ and/or $R^{16}$ are preferably tertiary alkyl groups.

In the formula (I-2), $R^{21}$ is preferably a hydrogen atom, an aliphatic group having 1 to 10 carbon atoms, an acyl group having 2 to 10 carbon atoms, an oxy radical group, or a hydroxyl group, more preferably a hydrogen atom, an alkyl group having 1 to 3 carbon atoms, an acyl group having 2 to 7 carbon atoms, an oxy radical group, or a hydroxyl group, more preferably a hydrogen atom, an acetyl group, an oxy radical group, or a hydroxyl group, most preferably a hydrogen atom.

Each of $R^{22}$ to $R^{25}$ is preferably a hydrogen atom or an aliphatic group having 1 to 10 carbon atoms, more preferably a hydrogen atom or an alkyl group having 1 to 5 carbon atoms, still more preferably a hydrogen atom or an alkyl group having 1 to 2 carbon atoms, and most preferably all of $R^{22}$ to $R^{25}$ are methyl groups.

Q is preferably a nonmetallic atomic group necessary for forming a 5- to 7-membered ring selected from a carbon atom, a hydrogen atom, an oxygen atom, a sulfur atom and a nitrogen atom, more preferably a nonmetallic atomic group necessary for forming a 5- to 7-membered ring selected from a carbon atom, a hydrogen atom, an oxygen atom and a nitrogen atom, still more preferably a nonmetallic atomic group necessary for forming a 5- to 7-membered ring selected from a carbon atom, a hydrogen atom and a nitrogen atom, most preferably a nonmetallic atomic group necessary for a piperidine ring.

In the invention, the compound represented by the formula (I-1) is preferably a compound wherein $R^{11}$ represents a hydrogen atom and $R^{12}$, $R^{13}$, $R^{15}$ and $R^{16}$ each independently represents a hydrogen atom or a tertiary alkyl group having 3 to 8 carbon atoms. The compound represented by the formula (I-2) is preferably a compound wherein $R^{21}$ represents a hydrogen atom, an alkyl group having 1 to 20 carbon atoms, or an oxy radical, $R^{22}$, $R^{23}$, $R^{24}$ and $R^{25}$ each represents a hydrogen atom or a methyl group, and Q represents a nonmetallic atomic group necessary for forming a 5- to 7-membered ring selected from a carbon atom, a hydrogen atom and a nitrogen atom.

In the invention, two or more kinds of compounds (I) are preferably contained. By doing so, light resistance can be more effectively improved. A combination of two or more kinds of compounds (I) is not particularly limited, but it is preferable that the compound represented by the formula (I-1) is combined with the compound represented by the formula (I-2).

Hereinafter, the compounds represented by the formula (I-1) or (I-2) in the invention are exemplified by exemplary compounds (I-1) to (I-52), but the invention is not limited thereto.

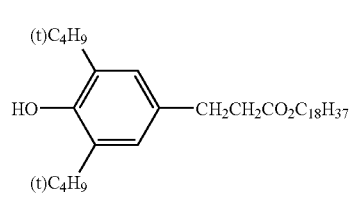 (I-1)
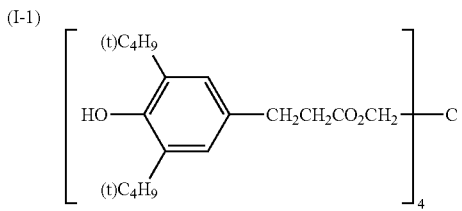 (I-2)
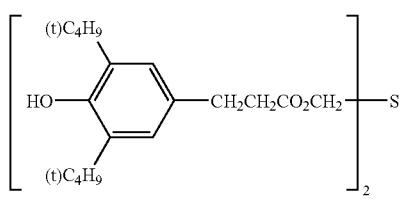 (I-3)
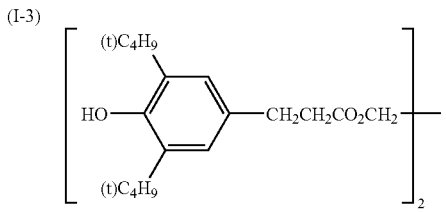 (I-4)
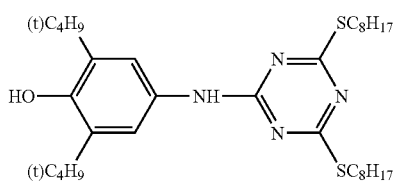 (I-5)
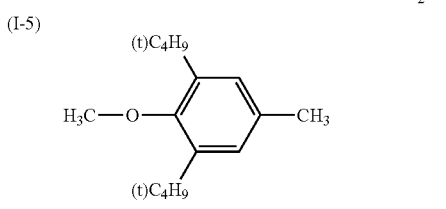 (I-6)
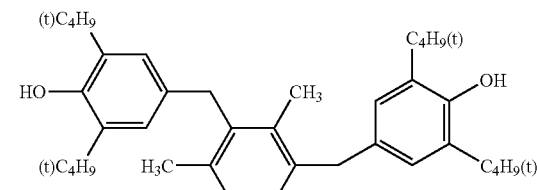 (I-7)
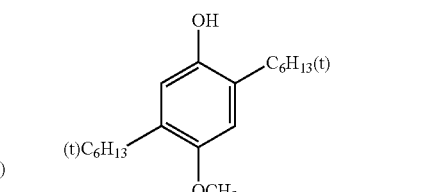 (I-8)
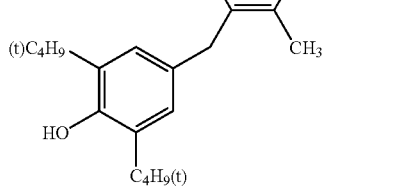 (I-9)
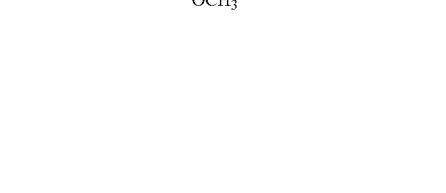 (I-10)
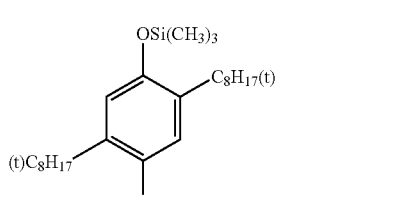 (I-11)
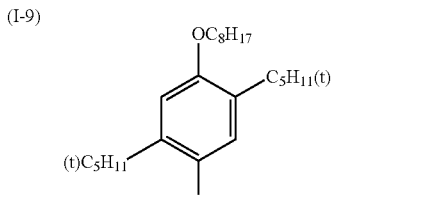 (I-12)
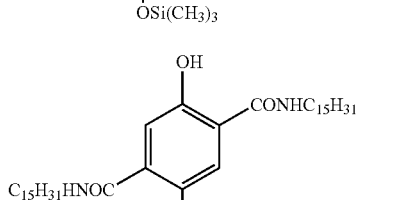 (I-13)
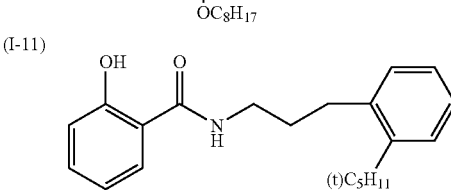 (I-14)

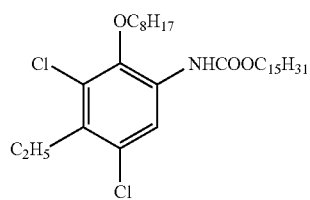 (I-15)
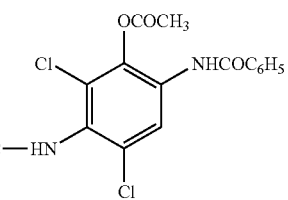 (I-16)
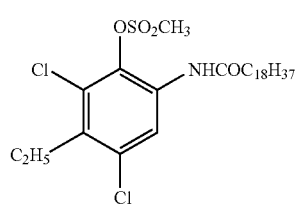 (I-17)
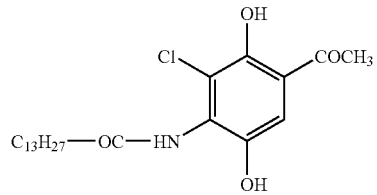 (I-18)
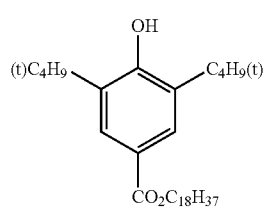 (I-19)
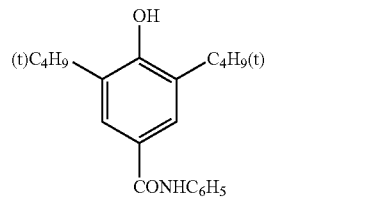 (I-20)
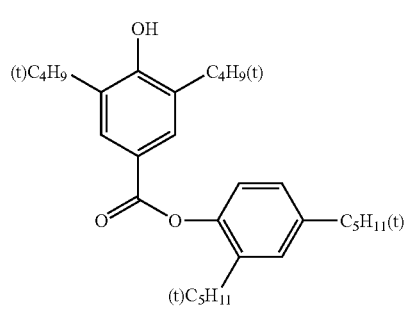 (I-21)
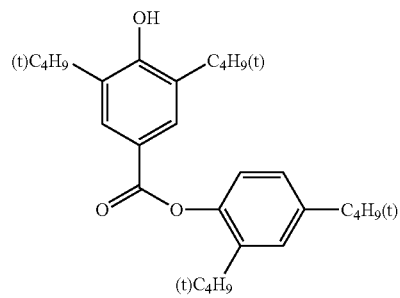 (I-22)
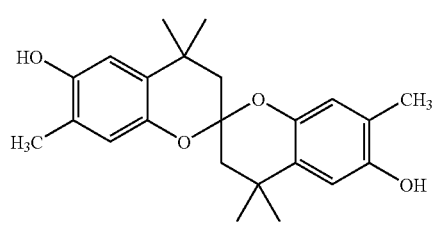 (I-23)
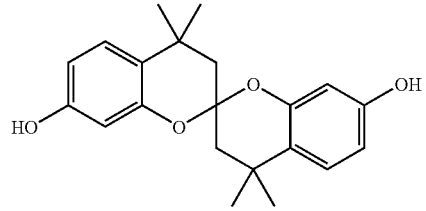 (I-24)
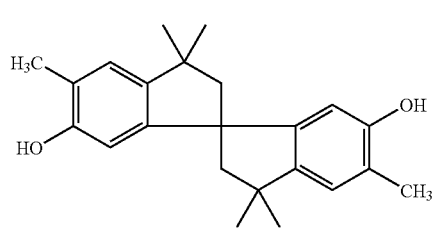 (I-25)
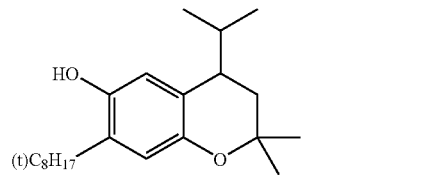 (I-26)
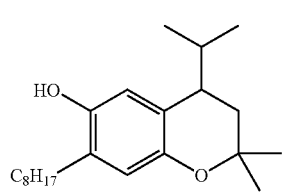 (I-27)
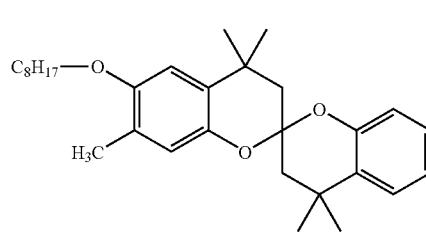 (I-28)

-continued
(I-29)
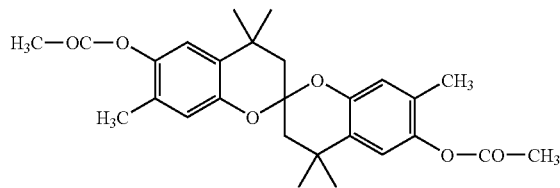
(I-30)
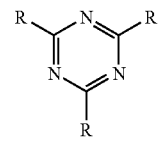
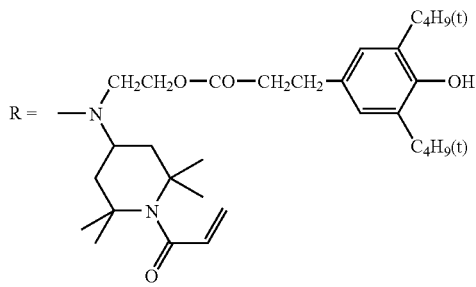
(I-31)
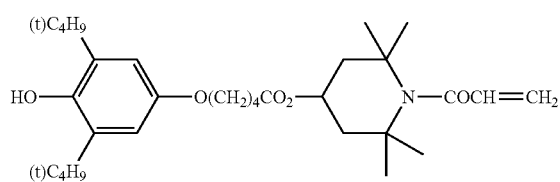
(I-32)
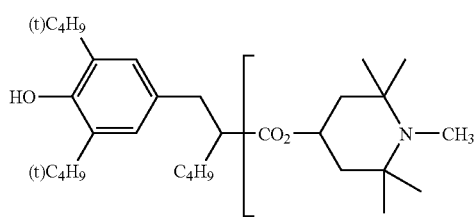
(I-33)
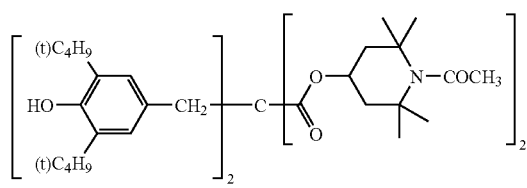
(I-34)
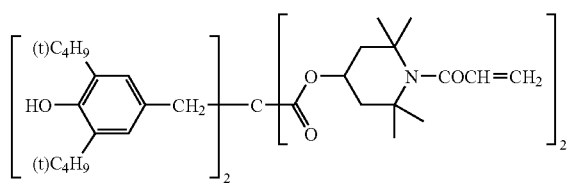
(I-35)
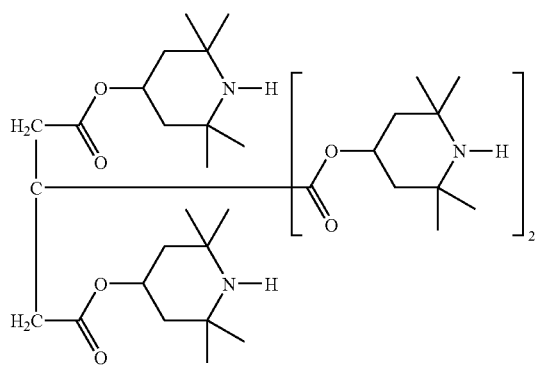
(I-36)
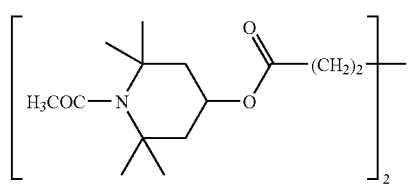
(I-37)
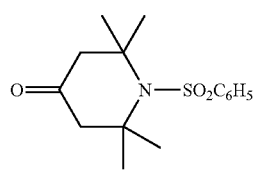
(I-38)
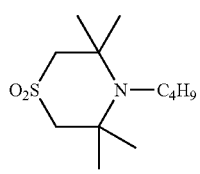
(I-39)
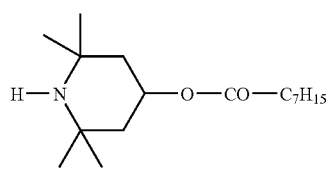
(I-40)

-continued
(I-41) 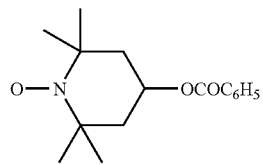
(I-42) 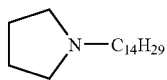
(I-43) 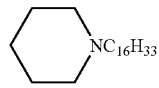
(I-44) 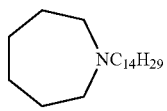
(I-45) 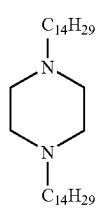
(I-46) 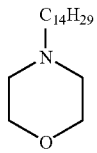
(I-47) 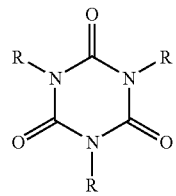
(I-48) 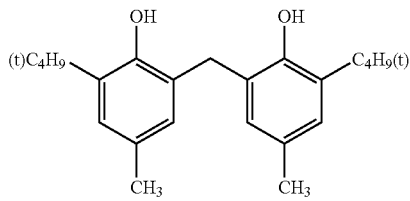
(I-49) 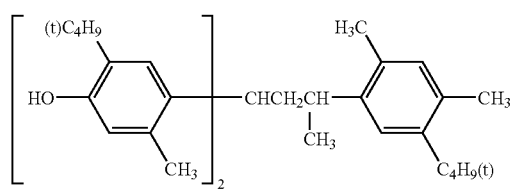
(I-50) 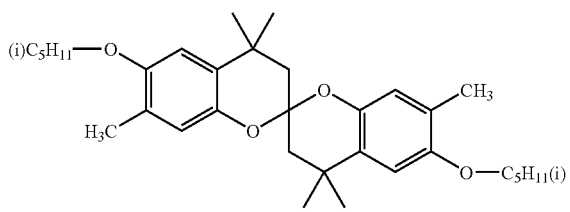
(I-51) 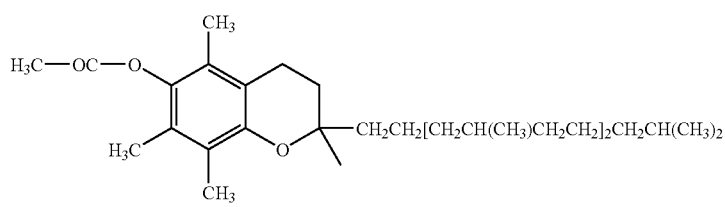
(I-52) 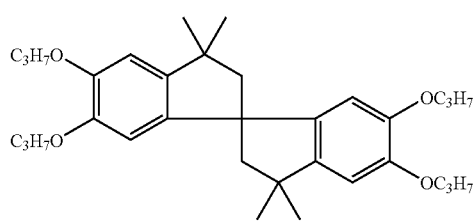

These compounds can be synthesized by methods described in U.K. Patent No. 1,326,889, U.K. Patent No. 1,354,313, U.K. Patent No. 1,410,846, U.S. Pat. No. 3,336, 135, U.S. Pat. No. 4,268,593, U.S. Pat. No. 4,558,131, U.S. Pat. No. 4,584,265, Japanese Patent Application Publication (JP-B) No. 51-1420, JP-B No. 52-6523, Japanese Patent Laid-Open (JP-A) No. 58-114036, JP-A No. 59-5246, JP-A No. 61-73152, JP-A No. 61-86750, JP-A No. 61-90155, JP-A No. 61-90156, and JP-A No. 61-172246 or by modifications thereto.

(Compounds Represented by the Formula (II-1) or (II-2))

The near-infrared-absorbing material of the invention contains at least one kind of second compound represented by the following formula (II-1) or (II-2):

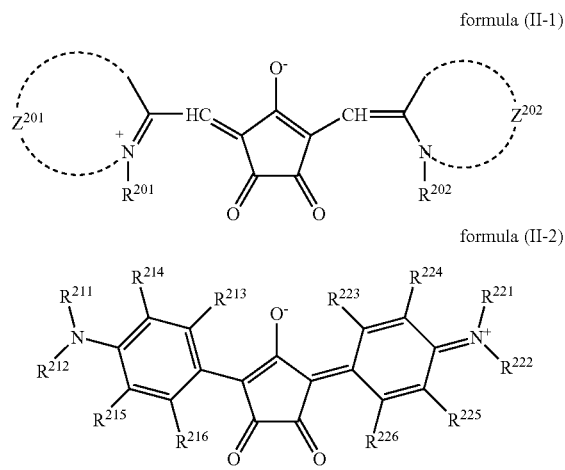

formula (II-1)

formula (II-2)

wherein $R^{201}$, $R^{202}$, $R^{211}$, $R^{212}$, $R^{221}$ and $R^{222}$ each independently represents a hydrogen atom, an aliphatic group, an aromatic group, or a heterocyclic group bound via a carbon atom.

Each of $R^{201}$ and $R^{202}$ is preferably a hydrogen atom, an aliphatic group having 1 to 30 carbon atoms, an aromatic group having 6 to 30 carbon atoms, or a heterocyclic group having 2 to 30 carbon atoms bound via a carbon atom, more preferably a hydrogen atom, an alkyl or alkenyl group having 1 to 20 carbon atoms, a phenyl or naphthyl group having 6 to 20 carbon atoms, or a 5- or 6-membered heterocyclic group having 2 to 20 carbon atoms bound via a carbon atom, still more preferably a hydrogen atom, an alkyl group having 1 to 20 carbon atoms, or a phenyl group having 6 to 20 carbon atoms, further more preferably a hydrogen atom or an alkyl group having 1 to 20 carbon atoms.

Each of $R^{211}$, $R^{212}$, $R^{221}$ and $R^{222}$ is preferably an aliphatic group, an aromatic group, or a heterocyclic group bound via a carbon atom, more preferably an alkyl or alkenyl group having 1 to 30 carbon atoms, a phenyl or naphthyl group having 6 to 30 carbon atoms, or a heterocyclic group having 2 to 30 carbon atoms bound via a carbon atom, still more preferably an alkyl group having 1 to 20 carbon atoms, a phenyl group having 6 to 20 carbon atoms, or a heterocyclic group having 2 to 20 carbon atoms bound via a carbon atom, further more preferably an alkyl group having 1 to 15 carbon atoms or a phenyl group having 6 to 15 carbon atoms, most preferably an alkyl group having 1 to 10 carbon atoms.

$Z^{201}$ and $Z^{202}$ each represents a nonmetallic atomic group necessary for forming a nitrogen-containing heterocycle. The nitrogen-containing heterocycle formed by $Z^{201}$ or $Z^{202}$ is preferably a 5- or 6-membered nitrogen-containing heterocycle, more preferably a quinoline ring, benzothiazole ring, naphthothiazole ring, benzoxazole ring, indolenine ring or benzoindolenine ring, still more preferably a quinoline ring, benzothiazole ring, naphthothiazole ring, indolenine ring or benzoindolenine ring.

$R^{213}$ to $R^{216}$ and $R^{223}$ to $R^{226}$ each independently represents a hydrogen atom or a substituent group, and $R^{213}$ and $R^{214}$, $R^{214}$ and $R^{211}$, $R^{211}$ and $R^{212}$, $R^{212}$ and $R^{215}$, $R^{215}$ and $R^{216}$, $R^{223}$ and $R^{224}$, $R^{224}$ and $R^{221}$, $R^{221}$ and $R^{222}$, $R^{222}$ and $R^{225}$, or $R^{225}$ and $R^{226}$ may be bound to each other to form a ring.

Examples of the substituent groups include those described as the "substituent groups of the alkyl unit in the substituted alkyl group, substituted alkenyl group, substituted alkynyl group, and of substituted aralkyl group" described above. When $R^{213}$ to $R^{216}$ and $R^{223}$ to $R^{226}$ each represent a substituent group, the substituent group is preferably a halogen atom, alkyl group, alkenyl group, alkynyl group, aryl group, heterocyclic group, cyano group, hydroxyl group, nitro group, carboxyl group, alkoxy group, aryloxy group, silyloxy group, heterocyclic oxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or aryl sulfonylamino group, mercapto group, alkylthio group, arylthio group, heterocyclic thio group, sulfamoyl group, sulfo group, alkyl or aryl sulfinyl group, alkyl or aryl sulfonyl group, acyl group, aryloxycarbonyl group, alkoxycarbonyl group, carbamoyl group, imido group, phosphino group, phosphinyl group, phosphinyloxy group, phosphinylamino group, or silyl group, more preferably a halogen atom, alkyl group, aryl group, cyano group, hydroxyl group, nitro group, carboxyl group, alkoxy group, aryloxy group, silyloxy group, acyloxy group, carbamoyloxy group, amino group, acylamino group, mercapto group, alkylthio group, arylthio group, sulfamoyl group, sulfo group, alkyl or aryl sulfinyl group, alkyl or aryl sulfonyl group, acyl group, aryloxycarbonyl group, alkoxycarbonyl group, carbamoyl group, imido group, phosphino group, phosphinyl group, phosphinyloxy group, phosphinylamino group, or silyl group, still more preferably a halogen atom, alkyl group, aryl group, cyano group, hydroxyl group, carboxyl group, alkoxy group, aryloxy group, silyloxy group, amino group, acylamino group, alkylthio group, arylthio group, acyl group, carbamoyl group, or silyl group, still more preferably a halogen atom, cyano group, hydroxyl group, carboxyl group, alkyl or alkoxy group having 1 to 20 carbon atoms, silyloxy group, amino group, acylamino group, alkylthio group, acyl group, carbamoyl group, silyl group, aryl or aryloxy group having 6 to 20 carbon atoms, or arylthio group, further more preferably a halogen atom, cyano group, hydroxyl group, alkyl or alkoxy group having 1 to 12 carbon atoms, amino group, or aryl or aryloxy group having 6 to 12 carbon atoms, even more preferably a halogen atom, hydroxyl group, or alkyl or alkoxy group having 1 to 8 carbon atoms.

The compounds represented by the formula (II-1) are preferably those wherein the nitrogen-containing heterocycle formed by each of $Z^{201}$ and $Z^{202}$ is a quinoline ring, benzothiazole ring, naphthothiazole ring, indolenine ring or benzoindolenine ring, and $R^{201}$ and $R^{202}$ each represents a hydrogen atom or an alkyl group having 1 to 15 carbon atoms. The compounds are more preferably those wherein the nitrogen-containing heterocycle formed by each of $Z^{201}$ and $Z^{202}$ is a quinoline ring, naphthothiazole ring, or benzoindolenine ring, and $R^{201}$ and $R^{202}$ each represent a hydrogen atom or an alkyl group having 1 to 10 carbon atoms.

The compounds represented by the formula (II-2) are preferably those wherein $R^{213}$ to $R^{215}$ and $R^{223}$ to $R^{225}$ each represents a hydrogen atom, an alkyl group having 1 to 3 carbon atoms, or a halogen atom, $R^{216}$ and $R^{226}$ each represents a hydroxyl group or an acylamino group, and $R^{211}$, $R^{212}$, $R^{221}$ and $R^{222}$ each represent an alkyl group having 1 to 10 carbon atoms.

Among the compounds represented by the formula (II-1) or (II-2), the compounds represented by the formula (II-2) are preferable as the compound (II) in the invention.

The compounds represented by the formula (II-2) are more preferably those compounds wherein $R^{213}$ and $R^{223}$ each represents a hydrogen atom, $R^{214}$ and $R^{211}$, $R^{215}$ and $R^{212}$, $R^{224}$ and $R^{221}$, or $R^{225}$ and $R^{222}$ are alkyl groups bound to each other to a 5- or 6-membered ring, and $R^{216}$ and $R^{226}$ each represents a hydroxyl group, or those compounds wherein $R^{211}$, $R^{212}$, $R^{221}$ and $R^{222}$ each represents an alkyl group, $R^{213}$ to $R^{215}$ and $R^{223}$ to $R^{225}$ each represents a hydrogen atom, and $R^{216}$ and $R^{226}$ each represents a hydroxyl group.

Hereinafter, the compounds represented by the formula (II-1) or (II-2) in the invention are exemplified by exemplary compounds (II-1) to (II-30), but the invention is not limited thereto.

(Compounds Represented by the Formula (II-1))

(II-1)
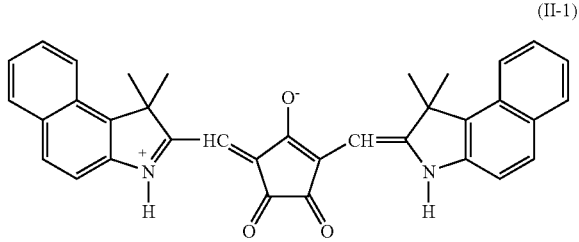

(II-2)
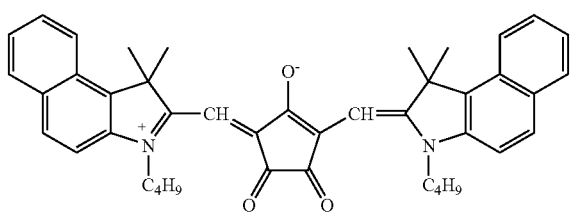

(II-3)
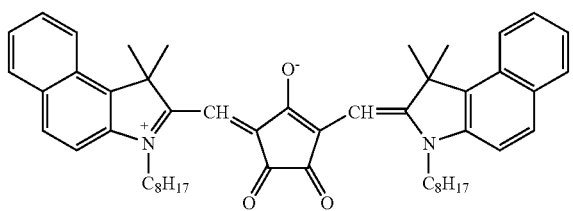

(II-4)
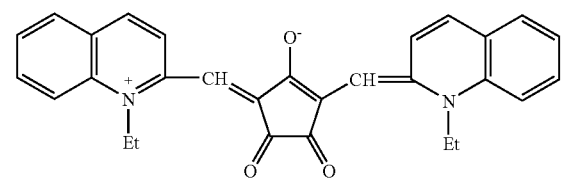

-continued (II-5)
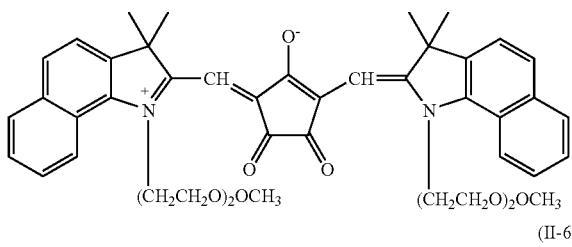

(II-6)
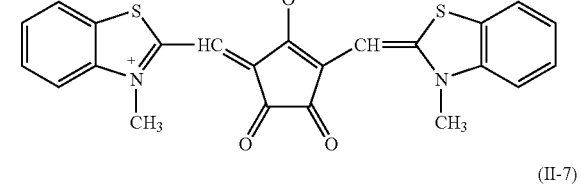

(II-7)
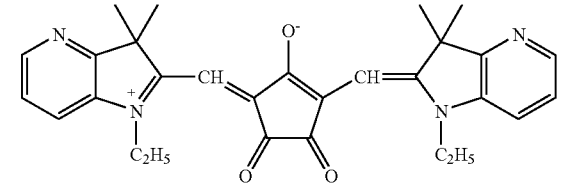

(II-8)
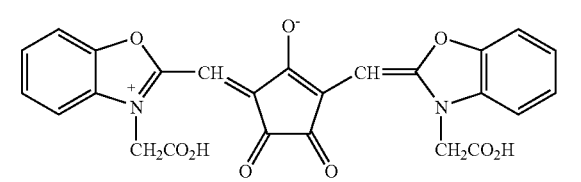

(II-9)
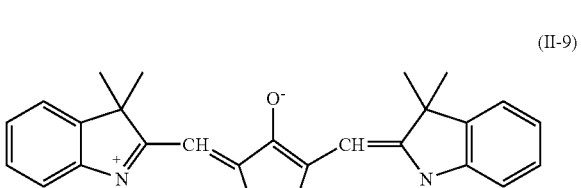

(II-10)
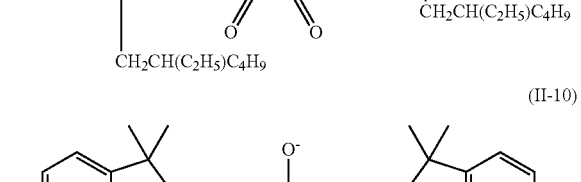

(II-11)
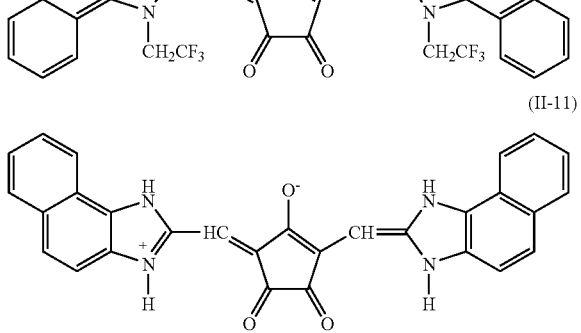

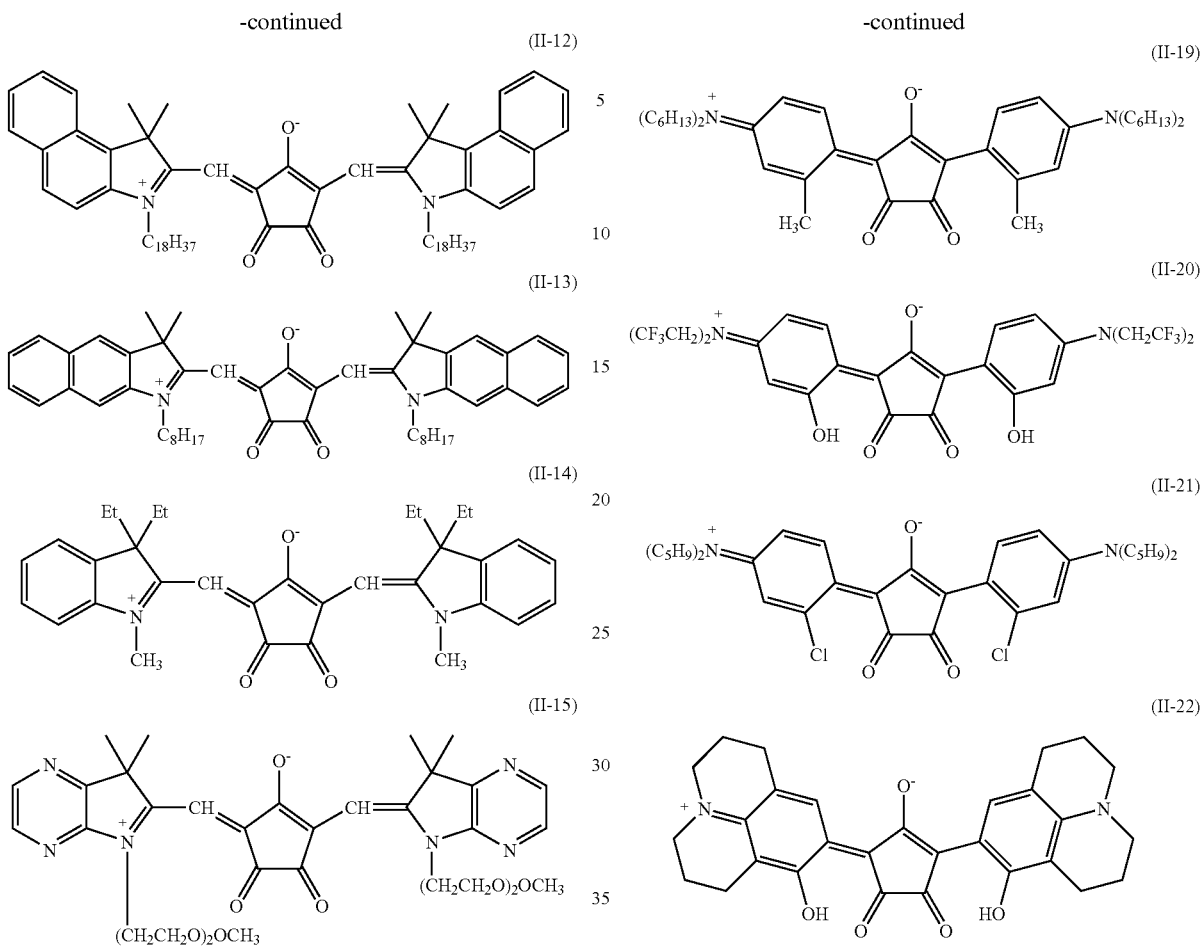
(Compounds Represented by the Formula (II-2))
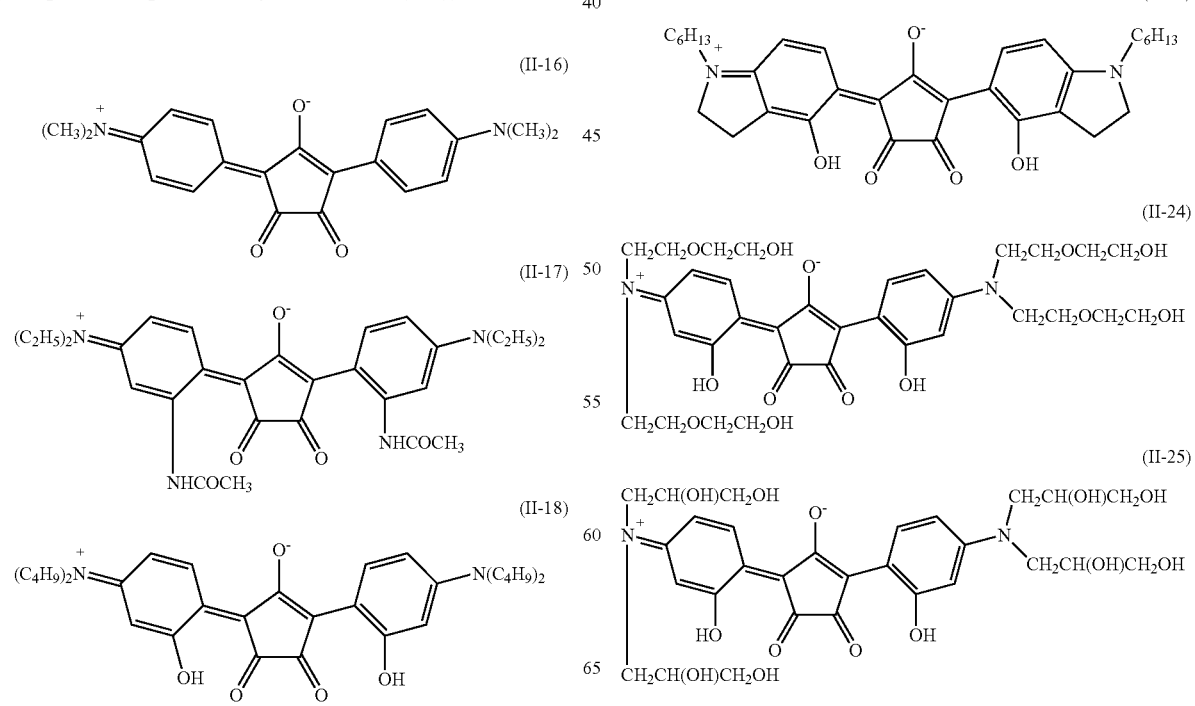

-continued

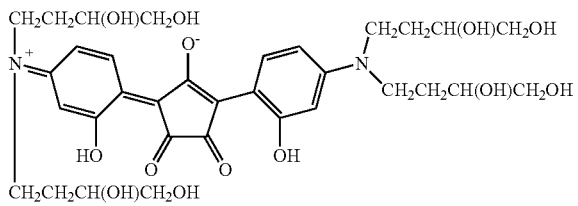
(II-26)

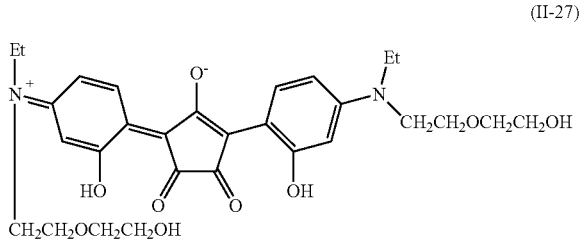
(II-27)

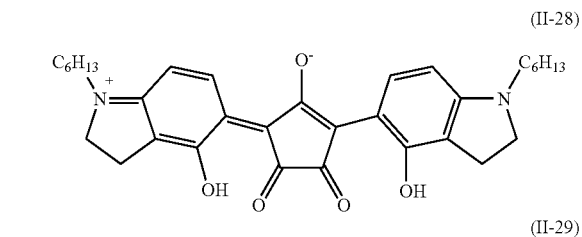
(II-28)

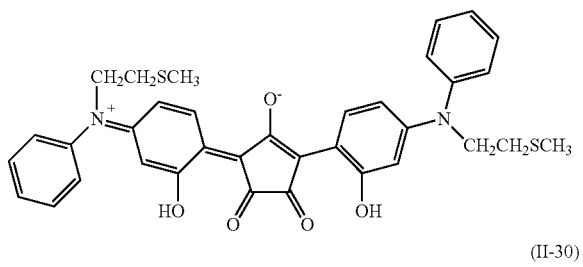
(II-29)

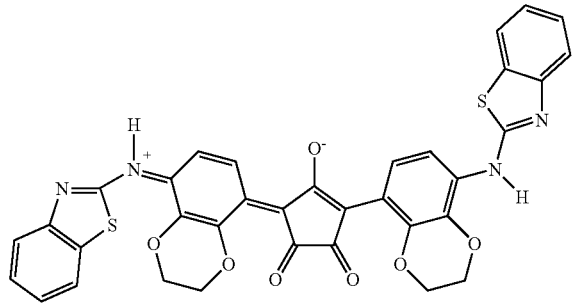
(II-30)

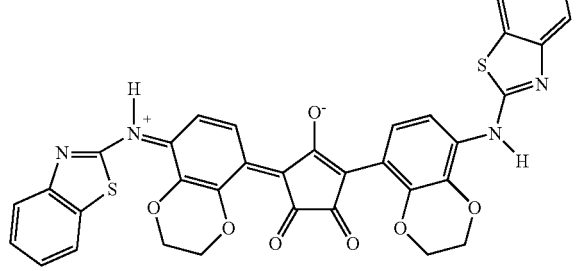

The compounds represented by the formula (II-1) or (II-2) can be synthesized by reference to methods described in, for example, JP-A No. 2-84383, JP-B No. 51-41061, JP-A No. 5-313305, and pp. 935-939 in Liebig's Annalen der Chemie (1993).

For example, when the compound represented by the formula (II-2) is synthesized, the molar ratio of the used aniline compound to croconic acid is preferably from 1.5 to 3, more preferably from 1.8 to 2.5, still more preferably from 1.9 to 2.1.

As a reaction solvent, it is possible to employ, for example, amide-based solvents (for example, N,N-dimethylformamide, N,N-dimethylacetamide, and 1-methyl-2-pyrrolidone), sulfone-based solvents (for example, sulfolane), sulfoxide-based solvents (for example, dimethyl sulfoxide), ureido-based solvents (for example, tetramethyl urea), ether-based solvents (for example, dioxane and cyclopentyl methyl ether), ketone-based solvents (for example, acetone and cyclohexanone), hydrocarbon-based solvents (for example, toluene, xylene, mesitylene and n-octane), halogen-based solvents (for example, tetrachloroethane and chlorobenzene), alcohol-based solvents (for example, 1-butanol, ethylene glycol, and cyclohexanol), and carboxylic acid-based solvents (for example, acetic acid), and these solvents can be used alone or as a mixed solvent thereof.

The reaction is conducted preferably in the absence of a solvent, or the solvent when used is preferably a hydrocarbon-based solvent, a halogen-based solvent, an alcohol-based solvent, an ether-based solvent or a carboxylic acid-based solvent, more preferably a hydrocarbon-based solvent, a halogen-based solvent or an alcohol-based solvent.

The reaction can be carried out for a reaction time in a range of 5 minutes to 30 hours at a temperature of 0 to 250° C., preferably 50 to 200° C., more preferably 60 to 150° C.

During the reaction, water generated as by-product is preferably removed out of the system, and a method of distilling away water only or together with a solvent under reduced pressure or at normal pressures, a method of removing water with an absorbent such as molecular sieve, or a method of removing water with a dehydration condensation agent such as acetic anhydride is preferably used.

The starting aniline compound can be synthesized by reference to a method described in JP-A No. 10-29976.

The content of the compound (II) in the near-infrared-absorbing material of the invention is not particularly limited and is preferably $10^{-10}$ to 20% by weight, more preferably $10^{-7}$ to 5% by weight, still more preferably $10^{-4}$ to 3% by weight, based on the total solid content. When the content of the compound (II) is in these ranges, excellent near-infrared absorption performance can be obtained.

(Ultraviolet-Absorbing Compound)

Preferably, the near-infrared-absorbing material of the invention further contains at least one kind of ultraviolet-absorbing compound in addition to the compounds (I) and (II). By doing so, light resistance can be more effectively improved.

The ultraviolet-absorbing compound in the invention is meant to be a compound having such absorption property as to have absorption in the ultraviolet range (10 to 400 nm) and, in solution, to show a spectral absorption maximum wavelength of 470 nm or less in a range of 270 to 1600 nm. From the viewpoint of improving light resistance, the spectral absorption maximum wavelength is preferably 430 nm or less, more preferably 410 nm or less, still more preferably 380 nm or less.

The chemical structure of the ultraviolet-absorbing compound in the invention is preferably a compound represented by any of formulae (III-1) to (III-9) below.

Hereinafter, compounds represented by the formulae (III-1) to (III-9) are illustrated.

formulae (III-1)

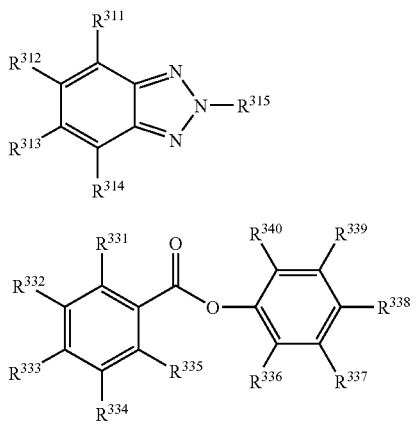

formula (III-2)

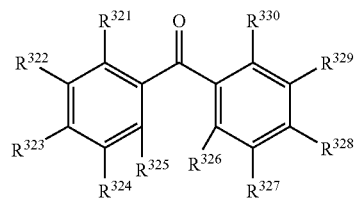

formula (III-3)

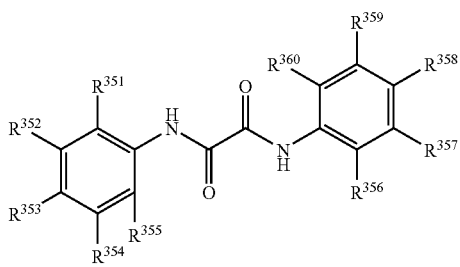

formula (III-4)

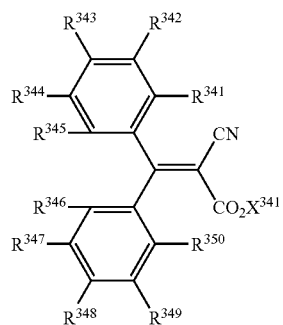

formula (III-5)

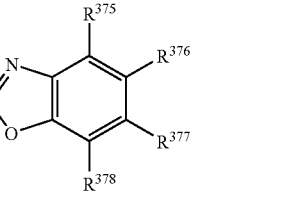

formula (III-6)

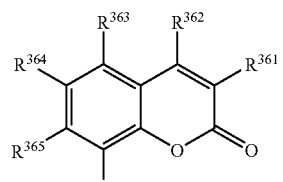

formula (III-7)

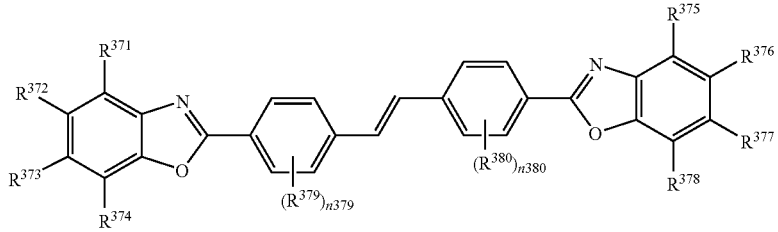

formula (III-8)

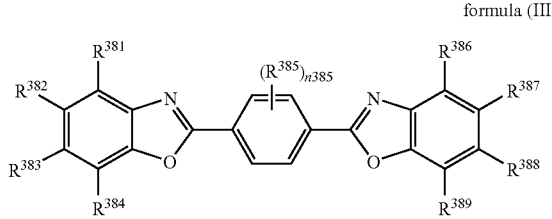

formula (III-9)

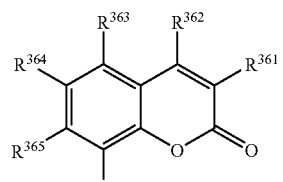

wherein $R^{311}$ to $R^{314}$, $R^{321}$ to $R^{366}$, $R^{371}$ to $R^{378}$, $R^{381}$ to $R^{384}$, $R^{386}$ to $R^{389}$, and $R^{391}$ to $R^{400}$ each independently represents a hydrogen atom or a substituent group; $R^{315}$ represents a hydrogen atom, an aliphatic group, an aromatic group, or a heterocyclic group bound via a carbon atom; $R^{379}$, $R^{380}$, and $R^{385}$ each independently represents a substituent group; $X^{341}$ represents a hydrogen atom, an aliphatic group, an aromatic group, or a heterocyclic group bound via a carbon atom; $n_{379}$, $n_{380}$ and $n_{385}$ each independently represents an integer of 0 to 4, and when $n_{379}$, $n_{380}$ or $n_{385}$ is 2 or more, a plurality of $R^{379}$s, $R^{380}$s or $R^{385}$s may be the same or different; and groups adjacent to each other may be bound to each other to form a ring.

The substituent groups represented by $R^{311}$ to $R^{314}$, $R^{321}$ to $R^{366}$, $R^{371}$ to $R^{378}$, $R^{381}$ to $R^{384}$, $R^{386}$ to $R^{384}$, $R^{386}$ to $R^{389}$, or $R^{391}$ to $R^{400}$ include those described as the "substituent groups of the alkyl unit in the substituted alkyl group, substituted alkenyl group, substituted alkynyl group, and of substituted aralkyl group" described above.

Each of $R^{311}$ to $R^{314}$ and $R^{321}$ to $R^{360}$ is more preferably a hydrogen atom, halogen atom, alkyl group, alkenyl group, alkynyl group, aryl group, cyano group, hydroxyl group, carboxyl group, alkoxy group, aryloxy group, silyloxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or aryl sulfonylamino group, mercapto group, alkylthio group, arylthio group, sulfamoyl group, sulfo group, alkyl or aryl sulfinyl group, alkyl or aryl sulfonyl group, acyl group, aryloxycarbonyl group, alkoxycarbonyl group, carbamoyl group, imido group, phosphino group, phosphinyl group, phosphinyloxy group, phosphinylamino group, or silyl group.

Each of $R^{311}$ to $R^{314}$ is more preferably a hydrogen atom, halogen atom, alkyl group, alkenyl group, aryl group, cyano group, hydroxyl group, carboxyl group, alkoxy group, aryloxy group, silyloxy group, amino group, alkylthio group, arylthio group, imido group, or silyl group, still more preferably a hydrogen atom, halogen atom, alkyl group, aryl group, alkoxy group, aryloxy group, silyloxy group, or amino group, further more preferably a hydrogen atom, halogen atom, or alkyl group, most preferably a hydrogen atom or halogen atom.

$R^{315}$ is preferably a hydrogen atom, alkyl group, alkenyl group, alkynyl group, or aryl group, more preferably a hydrogen atom, an alkyl group having 1 to 30 carbon atoms, an alkenyl group having 2 to 30 carbon atoms, an alkynyl group having 2 to 30 carbon atoms, or an aryl group having 6 to 30 carbon atoms, still more preferably a hydrogen atom, an alkyl group having 1 to 25 carbon atoms, an alkenyl group having 2 to 25 carbon atoms, or an aryl group having 6 to 25 carbon atoms, further more preferably an alkyl group having 1 to 22 carbon atoms or an aryl group having 6 to 22 carbon atoms, even more preferably an aryl group having 6 to 20 carbon atoms, most preferably an orthohydroxyphenyl group having 6 to 20 carbon atoms.

Each of $R^{321}$ to $R^{330}$ is preferably a hydrogen atom, halogen atom, alkyl group, alkenyl group, aryl group, cyano group, hydroxyl group, carboxyl group, alkoxy group, aryloxy group, silyloxy group, acyloxy group, acylamino group, aminocarbonylamino group, alkoxycarbonylamino group, aryloxycarbonylamino group, sulfamoylamino group, alkyl or aryl sulfonylamino group, mercapto group, alkylthio group, arylthio group, sulfamoyl group, sulfo group, alkyl or aryl sulfonyl group, acyl group, aryloxycarbonyl group, alkoxycarbonyl group, carbamoyl group, imido group, or silyl group, more preferably a hydrogen atom, halogen atom, alkyl group, aryl group, hydroxyl group, alkoxy group, aryloxy group, acyloxy group, acylamino group, alkyl or aryl sulfonylamino group, sulfamoyl group, acyl group, aryloxycarbonyl group, alkoxycarbonyl group, or carbamoyl group, still more preferably a hydrogen atom, halogen atom, alkyl group, hydroxyl group, alkoxy group, acyloxy group, acylamino group, acyl group, alkoxycarbonyl group, or carbamoyl group, further more preferably a hydrogen atom, halogen atom, alkyl group, hydroxyl group, alkoxy group, acylamino group, or alkoxycarbonyl group; and $R^{321}$ is most preferably a hydroxyl group.

Each of $R^{331}$ to $R^{340}$ is preferably a hydrogen atom, halogen atom, alkyl group, alkenyl group, aryl group, cyano group, hydroxyl group, carboxyl group, alkoxy group, aryloxy group, silyloxy group, acyloxy group, acylamino group, aminocarbonylamino group, alkoxycarbonylamino group, aryloxycarbonylamino group, sulfamoylamino group, alkyl or aryl sulfonylamino group, mercapto group, alkylthio group, arylthio group, sulfamoyl group, sulfo group, alkyl or aryl sulfonyl group, acyl group, aryloxycarbonyl group, alkoxycarbonyl group, carbamoyl group, imido group, or silyl group, more preferably a hydrogen atom, halogen atom, alkyl group, aryl group, hydroxyl group, alkoxy group, aryloxy group, acyloxy group, acylamino group, alkyl or aryl sulfonylamino group, sulfamoyl group, acyl group, aryloxycarbonyl group, alkoxycarbonyl group, or carbamoyl group, still more preferably a hydrogen atom, halogen atom, alkyl group, hydroxyl group, alkoxy group, acyloxy group, acylamino group, acyl group, alkoxycarbonyl group, or carbamoyl group, further more preferably a hydrogen atom, halogen atom, alkyl group, hydroxyl group, alkoxy group, acylamino group, or alkoxycarbonyl group; and $R^{331}$ is most preferably a hydroxyl group.

Each of $R^{341}$ to $R^{350}$ is preferably a hydrogen atom, halogen atom, alkyl group, aryl group, hydroxyl group, alkoxy group, aryloxy group, silyloxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or aryl sulfonylamino group, alkylthio group, arylthio group, sulfamoyl group, acyl group, aryloxycarbonyl group, alkoxycarbonyl group, carbamoyl group, or silyl group, more preferably a hydrogen atom, halogen atom, alkyl group, aryl group, alkoxy group, aryloxy group, amino group, acylamino group, alkylthio group, or arylthio group, still more preferably a hydrogen atom, halogen atom, alkyl group, alkoxy group, amino group, or acylamino group, most preferably a hydrogen atom, alkoxy group, or amino group.

$X^{341}$ is preferably a hydrogen atom, alkyl group, alkenyl group, alkynyl group, or aryl group, more preferably a hydrogen atom, an alkyl group having 1 to 30 carbon atoms, an alkenyl group having 2 to 30 carbon atoms, an alkynyl group having 2 to 30 carbon atoms, or an aryl group having 6 to 30 carbon atoms, more preferably a hydrogen atom, an alkyl group having 1 to 25 carbon atoms, an alkenyl group having 2 to 25 carbon atoms, or an aryl group having 6 to 25 carbon atoms, still more preferably an alkyl group having 1 to 22 carbon atoms or an aryl group having 6 to 22 carbon atoms, most preferably an alkyl group having 1 to 18 carbon atoms.

Each of $R^{351}$ to $R^{360}$ is preferably a hydrogen atom, halogen atom, alkyl group, aryl group, cyano group, hydroxyl group, alkoxy group, aryloxy group, acyloxy group, amino group, acylamino group, mercapto group, alkylthio group, arylthio group, sulfamoyl group, alkyl or aryl sulfinyl group, alkyl or aryl sulfonyl group, acyl group, aryloxycarbonyl group, alkoxycarbonyl group, or silyl group, more preferably a hydrogen atom, halogen atom, alkyl group, aryl group, hydroxyl group, alkoxy group, acyloxy group, amino group, acylamino group, arylthio group, acyl group, aryloxycarbonyl group, or alkoxycarbonyl group, and $R^{351}$ is most preferably a hydroxyl group.

$R^{361}$ is preferably a hydrogen atom, halogen atom, alkyl group, alkenyl group, alkynyl group, aryl group, heterocyclic group, cyano group, hydroxyl group, nitro group, carboxyl group, alkoxy group, aryloxy group, silyloxy group, heterocyclic oxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or aryl sulfonylamino group, mercapto group, alkylthio group, arylthio group, heterocyclic thio group, sulfamoyl group, sulfo group, alkyl or aryl sulfinyl group, alkyl or aryl sulfonyl group, acyl group, aryloxycarbonyl group, alkoxycarbonyl group, carbamoyl group, imido group, phosphino group, phosphinyl group, phosphinyloxy group, phosphinylamino group, or silyl group, more preferably a hydrogen atom, halogen atom, alkyl group, aryl group, heterocyclic group, cyano group, hydroxyl group, alkoxy group, aryloxy group, silyloxy group, heterocyclic oxy group, alkoxycarbonyl group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or aryl sulfonylamino group, acyl group, aryloxycarbonyl group, alkoxycarbonyl group, carbamoyl group, or imido group, still more preferably a hydrogen atom, alkyl group, aryl group, heterocyclic group, amino group, acylamino group, aminocarbonylamino group, alkoxycarbonyl group, alkoxycarbonylamino group, aryloxycarbonylamino group, sulfamoylamino group, or alkyl or aryl sulfomylamino group, further more preferably an alkyl group, aryl group, heterocyclic group, alkoxycarbonyl group, or acylamino group.

Each of $R^{362}$, $R^{363}$, $R^{364}$ and $R^{366}$ is preferably a hydrogen atom, halogen atom, alkyl group, alkenyl group, alkynyl group, aryl group, heterocyclic group, cyano group, hydroxyl group, carboxyl group, alkoxy group, aryloxy group, silyloxy group, heterocyclic oxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or aryl sulfonylamino group, mercapto group, alkylthio group, arylthio group, heterocyclic thio group, sulfamoyl group, sulfo group, alkyl or aryl sulfinyl group, alkyl or aryl sulfonyl group, acyl group, aryloxycarbonyl group, alkoxycarbonyl group, carbamoyl group, imido group, phosphino group, phosphinyl group, phosphinyloxy group, phosphinylamino group, or silyl group, more preferably a hydrogen atom, halogen atom, alkyl group, aryl group, heterocyclic group, cyano group, hydroxyl group, alkoxy group, aryloxy group, or silyl group, still more preferably a hydrogen atom, halogen atom, or alkyl group, most preferably a hydrogen atom.

$R^{365}$ is preferably a hydrogen atom, halogen atom, alkyl group, alkenyl group, alkynyl group, aryl group, heterocyclic group, cyano group, hydroxyl group, nitro group, carboxyl group, alkoxy group, aryloxy group, silyloxy group, heterocyclic oxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or aryl sulfonylamino group, mercapto group, alkylthio group, arylthio group, heterocyclic thio group, sulfamoyl group, sulfo group, alkyl or aryl sulfinyl group, alkyl or aryl sulfonyl group, acyl group, aryloxycarbonyl group, alkoxycarbonyl group, carbamoyl group, imido group, phosphino group, phosphinyl group, phosphinyloxy group, phosphinylamino group, or silyl group, more preferably a hydrogen atom, halogen atom, alkyl group, aryl group, heterocyclic group, cyano group, hydroxyl group, alkoxy group, aryloxy group, silyloxy group, heterocyclic oxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or aryl sulfonylamino group, alkylthio group, arylthio group, heterocyclic thio group, sulfamoyl group, acyl group, aryloxycarbonyl group, alkoxycarbonyl group, carbamoyl group, imido group, or silyl group, still more preferably a hydrogen atom, alkyl group, aryl group, heterocyclic group, amino group, acylamino group, aminocarbonylamino group, alkoxycarbonylamino group, aryloxycarbonylamino group, sulfamoylamino group, or alkyl or aryl sulfonylamino group, further more preferably a heterocyclic group, amino group, or acylamino group.

Each of $R^{371}$, $R^{374}$, $R^{375}$ and $R^{378}$ is more preferably a hydrogen atom, halogen atom, alkyl group, aryl group, cyano group, hydroxyl group, alkoxy group, amino group, or mercapto group, still more preferably a hydrogen atom, halogen atom, alkyl group, hydroxyl group, alkoxy group, or amino group, most preferably a hydrogen atom.

Each of $R^{372}$, $R^{373}$, $R^{376}$ and $R^{377}$ is preferably a hydrogen atom, halogen atom, alkyl group, aryl group, heterocyclic group, cyano group, hydroxyl group, nitro group, carboxyl group, alkoxy group, aryloxy group, silyloxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl or aryl sulfonylamino group, mercapto group, alkylthio group, arylthio group, sulfamoyl group, alkyl or aryl sulfinyl group, alkyl or aryl sulfonyl group, acyl group, aryloxycarbonyl group, alkoxycarbonyl group, carbamoyl group, imido group, or silyl group, more preferably a hydrogen atom, halogen atom, alkyl group, aryl group, hydroxyl group, alkoxy group, aryloxy group, acyloxy group, amino group, acylamino group, mercapto group, alkylthio group, or sulfamoyl group, still more preferably a hydrogen atom, alkyl group, aryl group, alkoxy group, amino group, mercapto group, or alkylthio group, further more preferably a hydrogen atom, alkyl group, aryl group, or alkoxy group.

Each of $R^{379}$ and $R^{380}$ is preferably a halogen atom, alkyl group, aryl group, cyano group, hydroxyl group, alkoxy group, aryloxy group, silyloxy group, amino group, acylamino group, mercapto group, alkylthio group, arylthio group, heterocyclic thio group, or silyl group, more preferably a halogen atom, alkyl group, aryl group, alkoxy group, aryloxy group, alkylthio group, arylthio group, or heterocyclic thio group, still more preferably a halogen atom, alkyl group, aryl group, or alkoxy group.

Each of $n_{379}$ and $n_{380}$ is preferably 0 to 3, more preferably 0 to 2, still more preferably 0 or 1, most preferably 0.

$R^{381}$, $R^{384}$, $R^{386}$ and $R^{389}$ are preferably in the same scope as defined above in $R^{371}$, $R^{382}$, $R^{383}$, $R^{387}$ and $R^{388}$ are preferably in the same scope as defined above in $R^{372}$.

$R^{385}$ is preferably a halogen atom, alkyl group, aryl group, heterocyclic group, cyano group, hydroxyl group, alkoxy group, aryloxy group, heterocyclic oxy group, silyloxy group, amino group, acylamino group, mercapto group, alkylthio group, arylthio group, heterocyclic thio group, or silyl group, more preferably a halogen atom, alkyl group, aryl group, alkoxy group, aryloxy group, amino group, alkylthio group, or arylthio group, still more preferably a halogen atom, alkyl group, alkoxy group, amino group, or alkylthio group, further more preferably a halogen atom or alkyl group.

$n_{385}$ is preferably 0 to 3, more preferably 0 to 2, still more preferably 0 or 1, most preferably 0.

Preferably, two $R^{385}$s adjacent to each other are bound to each other to form a condensed ring to constitute a naphtho-1,4-yl group.

$R^{391}$, $R^{394}$, $R^{397}$ and $R^{400}$ are preferably in the same scope as defined above in $R^{371}$, $R^{392}$, $R^{393}$, $R^{398}$ and $R^{399}$ are preferably in the same scope as defined above in $R^{372}$.

Each of $R^{395}$ and $R^{396}$ is preferably a hydrogen atom, halogen atom, alkyl group, aryl group, heterocyclic group, cyano group, nitro group, hydroxyl group, alkoxy group, aryloxy group, heterocyclic oxy group, silyloxy group, amino group, acylamino group, mercapto group, alkylthio group, arylthio group, heterocyclic thio group, or silyl group, more preferably a hydrogen atom, halogen atom, alkyl group, aryl group, heterocyclic group, cyano group, nitro group, alkoxy group, aryloxy group, silyloxy group, amino group, acylamino group, alkylthio group, or arylthio group, still more preferably a hydrogen atom, halogen atom, alkyl group, cyano group, alkoxy group, or amino group, further more preferably a hydrogen atom or alkyl group.

Among the compounds represented by the formulae (III-1) to (III-9), the compounds represented by the formulae (III-1), (III-2), (III-3), (III-4), (III-6), (III-8) or (III-9) are preferable, the compounds represented by the formulae (III-1), (III-2), (III-3), (III-8) or (III-9) are more preferable, the compounds represented by the formulae (III-1), (III-2), (III-3) or (III-9) are still more preferable, the compounds represented by the formulae (III-1), (III-2) or (III-9) are further more preferable, and the compounds represented by the formulae (III-1) are most preferable.

In the invention, the compounds represented by the formula (III-1) are preferably those wherein $R^{311}$ to $R^{314}$ each independently represents a hydrogen atom, a halogen atom, or an alkyl group having 1 to 5 carbon atoms, and $R^{315}$ represents an orthohydroxyphenyl group having 6 to 20 carbon atoms.

The compounds represented by the formula (III-2) are preferably those wherein $R^{322}$ to $R^{330}$ each represents a hydrogen atom, a halogen atom, an alkyl group having 1 to 20 carbon atoms, a hydroxyl group, an alkoxy group having 1 to 20 carbon atoms, an acylamino group having 1 to 20 carbon atoms, or an alkoxycarbonyl group having 1 to 20 carbon atoms, and $R^{321}$ represents a hydroxyl group.

The compounds represented by the formula (III-3) are preferably those wherein $R^{332}$ to $R^{340}$ each independently represents a hydrogen atom, a halogen atom, an alkyl group having 1 to 20 carbon atoms, a hydroxyl group, an alkoxy group having 1 to 20 carbon atoms, an acylamino group having 1 to 20 carbon atoms, or an alkoxycarbonyl group having 1 to 20 carbon atoms, and $R^{331}$ represents a hydroxyl group.

The compounds represented by the formula (III-9) are preferably those wherein $R^{391}$, $R^{394}$, $R^{397}$ and $R^{400}$ each represents a hydrogen atom, $R^{392}$, $R^{393}$, $R^{398}$ and $R^{399}$ each independently represents a hydrogen atom, an alkyl group having 1 to 20 carbon atoms, an aryl group having 6 to 20 carbon atoms, or an alkoxy group having 1 to 20 carbon atoms, and $R^{395}$ and $R^{396}$ each represents a hydrogen atom or an alkyl group having 1 to 4 carbon atoms.

Hereinafter, the compounds represented by the formulae (III-1) to (III-9) in the invention are exemplified by exemplary compounds (III-1) to (III-165), but the invention is not limited thereto.

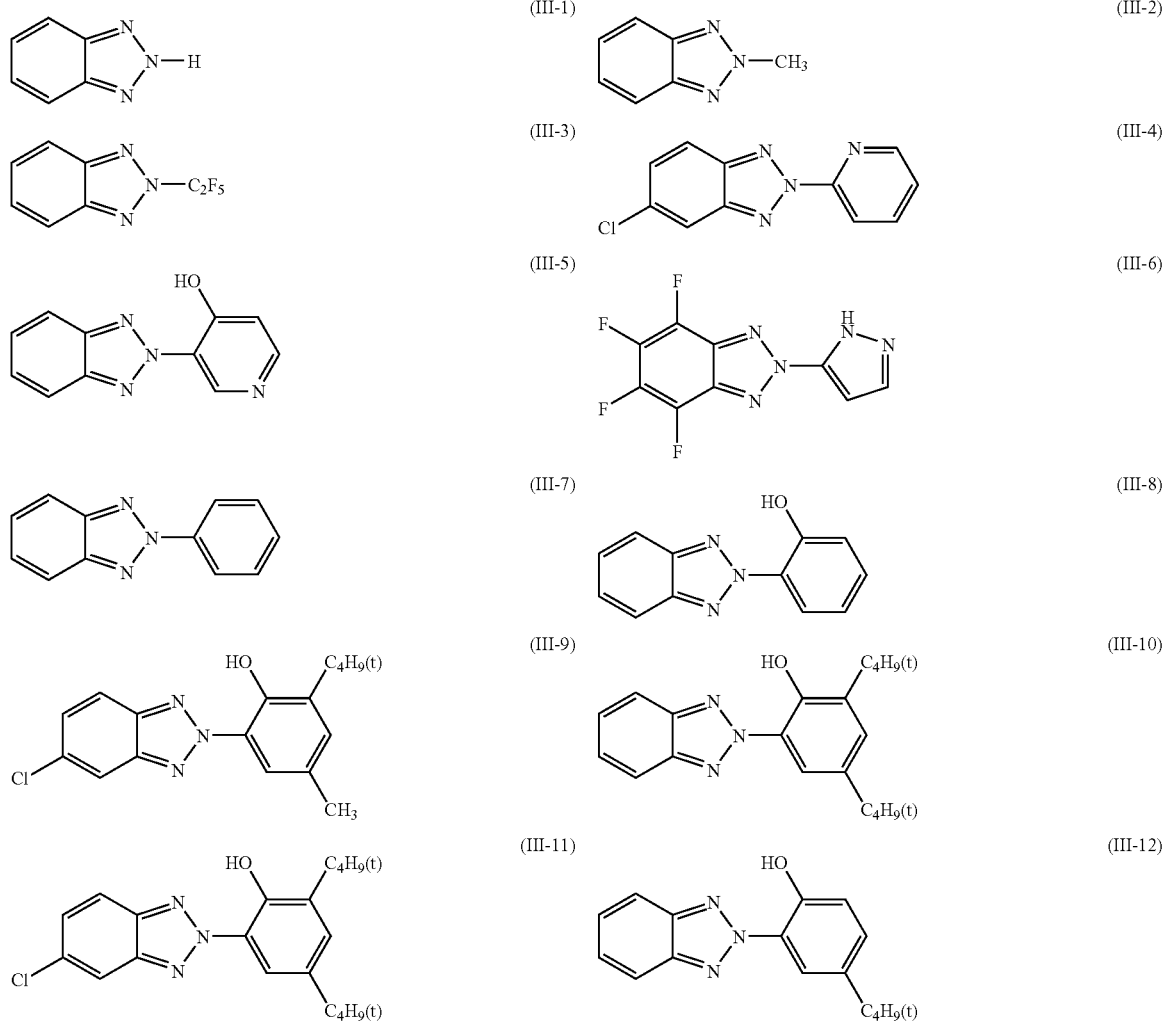

-continued
(III-13) 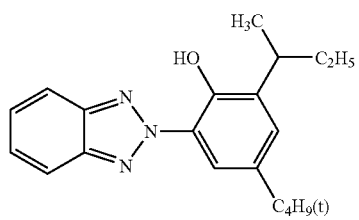
(III-14) 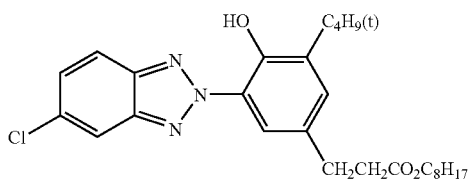
(III-15) 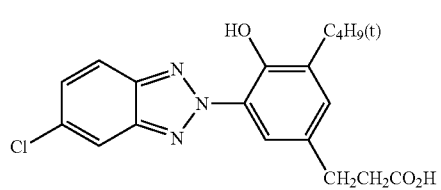
(III-16) 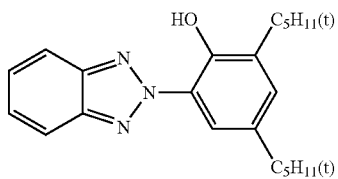
(III-17) 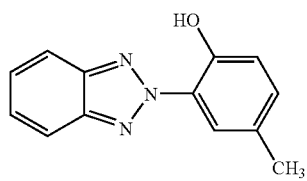
(III-18) 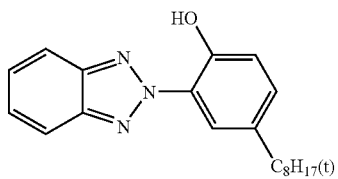
(III-19) 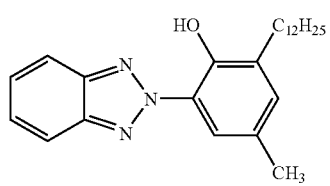
(III-20) 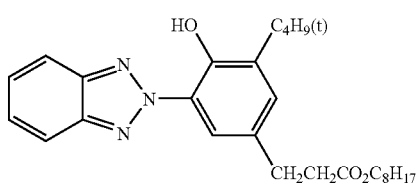
(III-21) 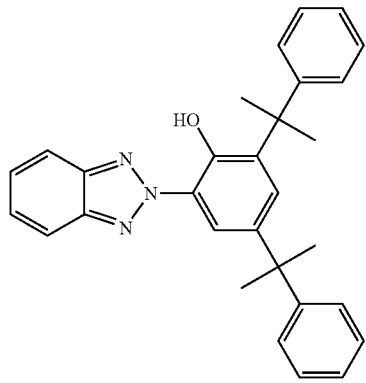
(III-22) 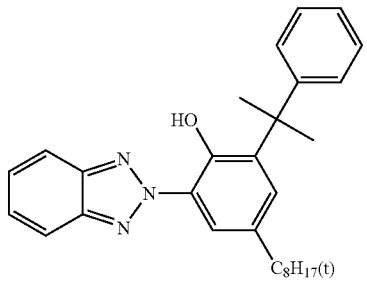
(III-23) 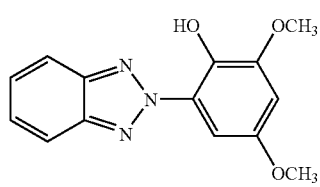
(III-24) 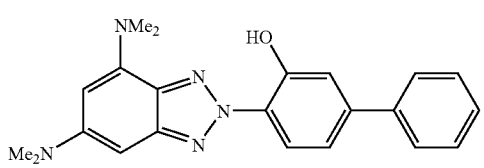
(III-25) 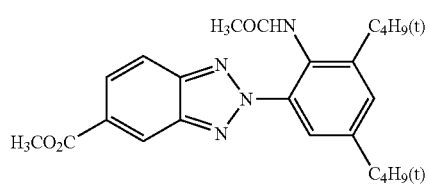
(III-26) 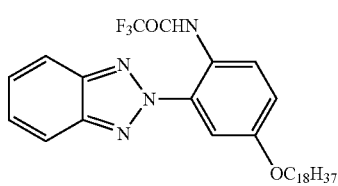

-continued

-continued
(III-42) 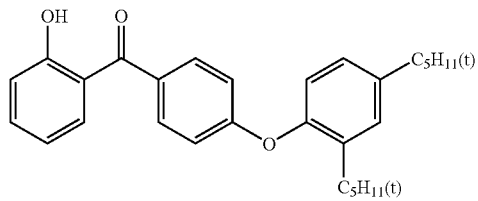
(III-43) 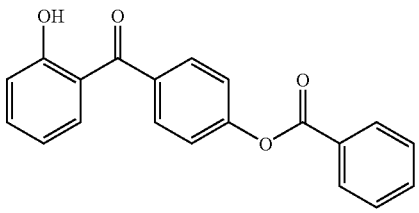
(III-44) 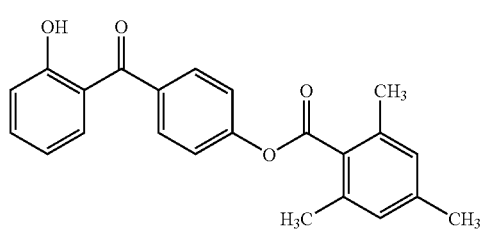
(III-45) 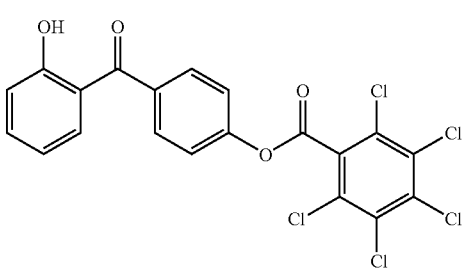
(III-46) 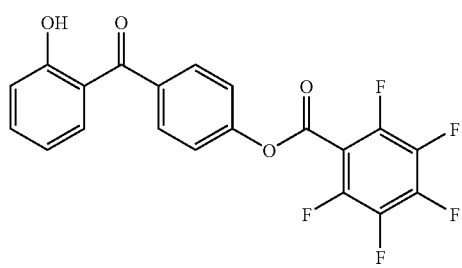
(III-47) 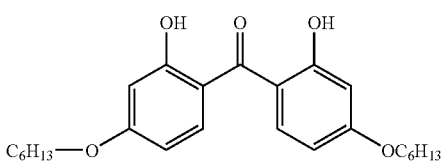
(III-48) 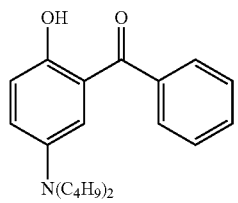
(III-49) 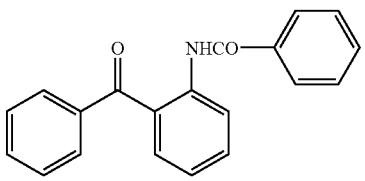
(III-50) 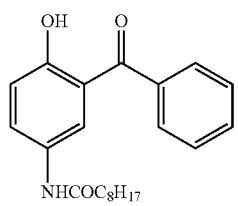
(III-51) 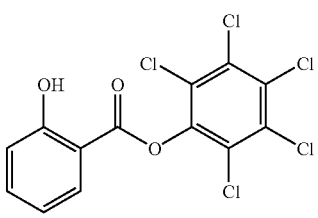
(III-52) 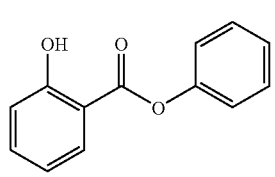
(III-53) 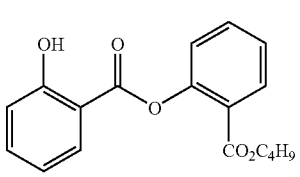
(III-54) 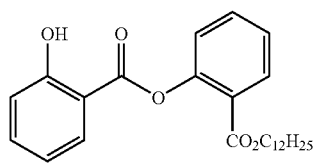
(III-55) 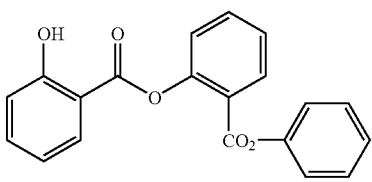

-continued
(III-56) 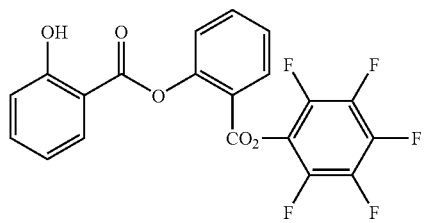
(III-57) 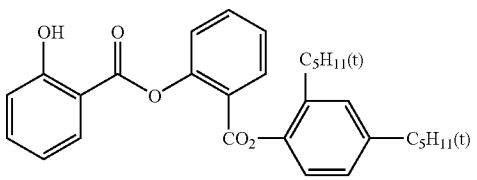
(III-58) 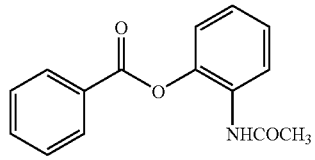
(III-59) 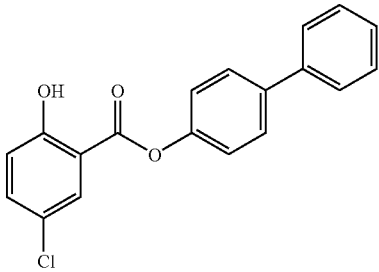
(III-60) 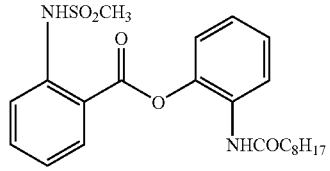
(III-61) 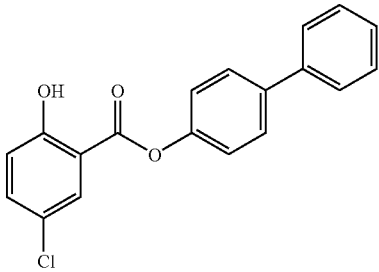
(III-62) 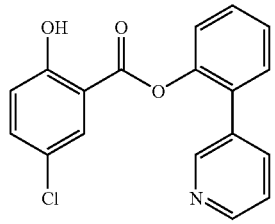
(III-63) 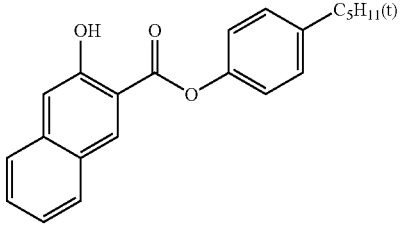
(III-64) 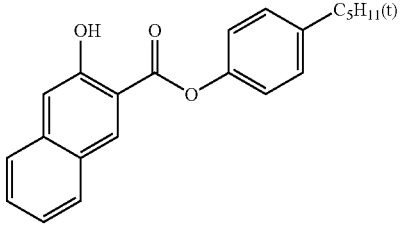
(III-65) 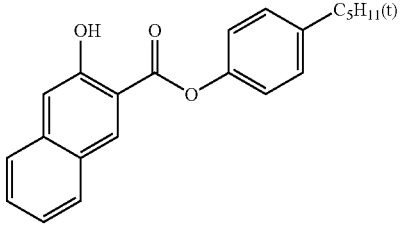
(III-66) 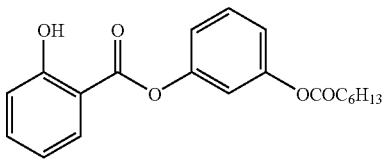
(III-67) 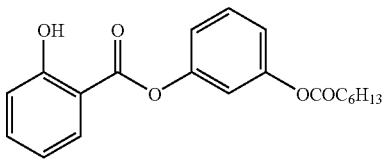
(III-68) 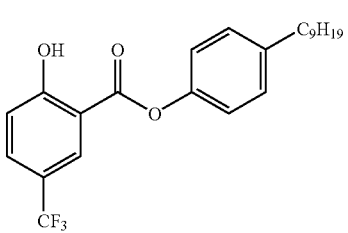
(III-69) 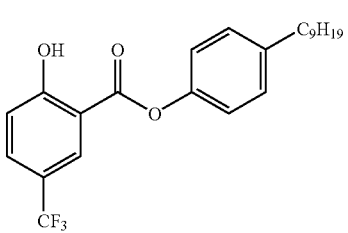

-continued
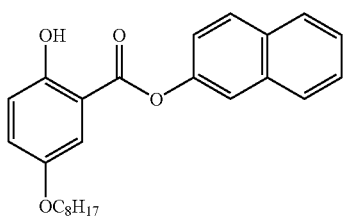
(III-70)
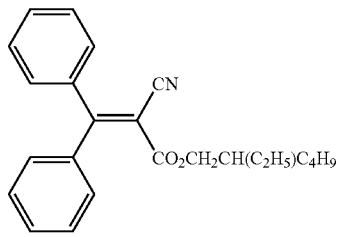
(III-71)
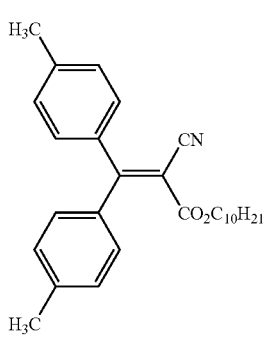
(III-72)
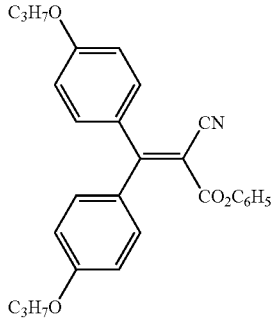
(III-73)
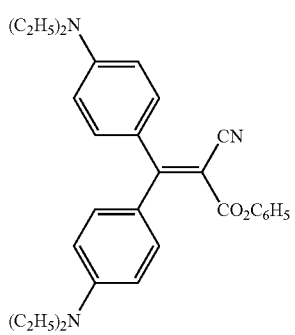
(III-74)
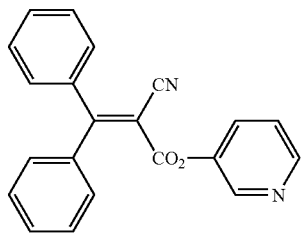
(III-75)
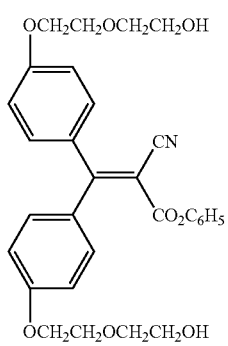
(III-76)
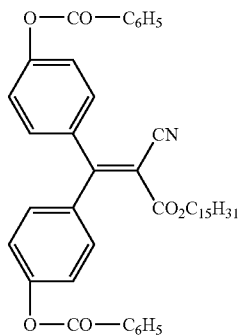
(III-77)
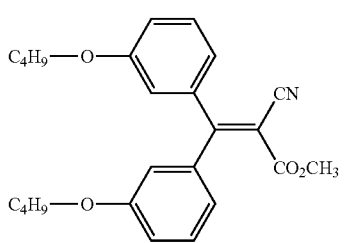
(III-78)
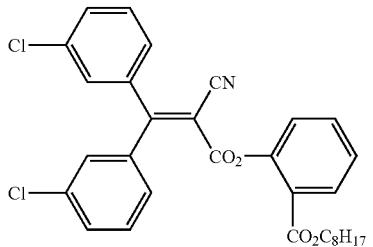
(III-79)

-continued (III-80), (III-81), (III-82), (III-83), (III-84), (III-85), (III-86), (III-87), (III-88), (III-89), (III-90), (III-91), (III-92), (III-93)

-continued
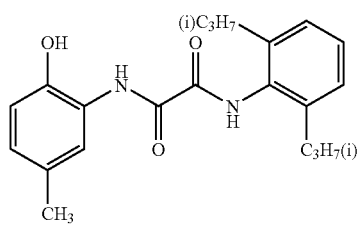
(III-94)
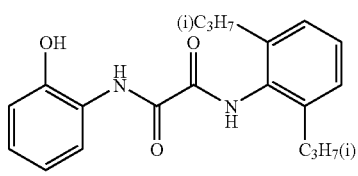
(III-95)
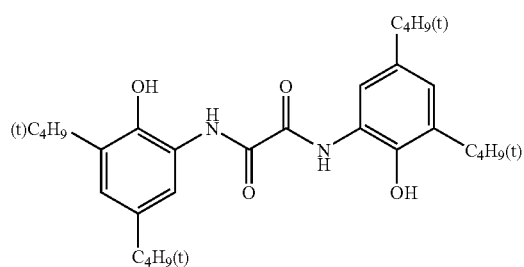
(III-96)
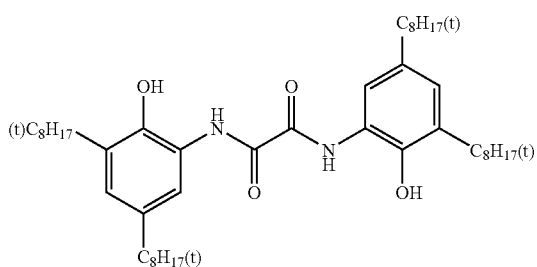
(III-97)
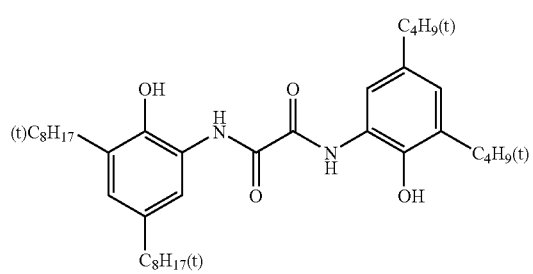
(III-98)
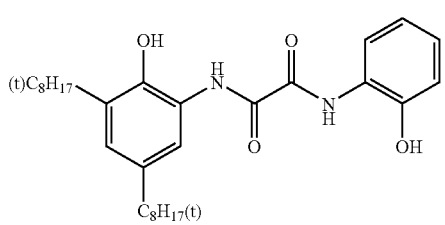
(III-99)
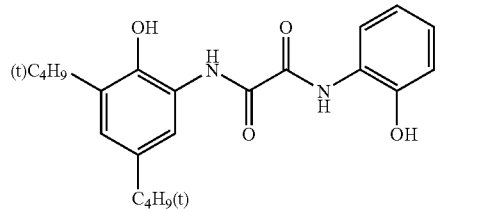
(III-100)
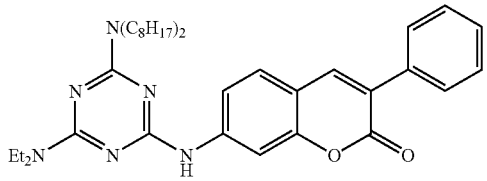
(III-101)
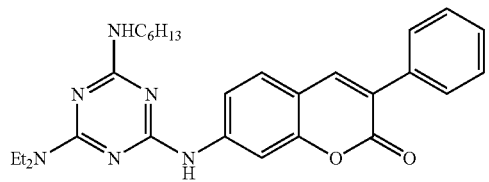
(III-102)
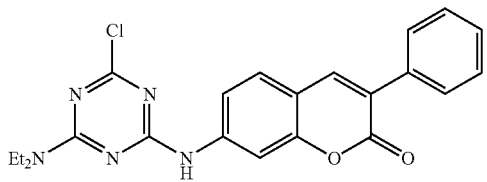
(III-103)
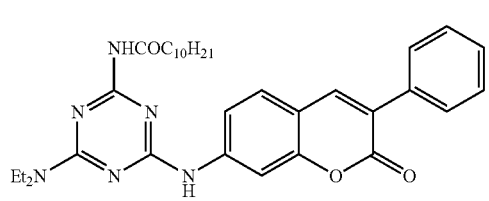
(III-104)
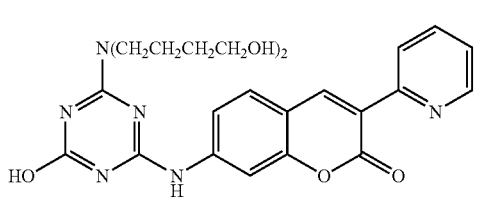
(III-105)
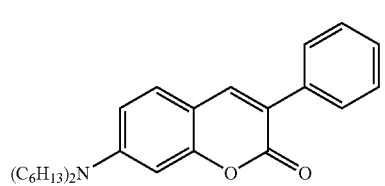
(III-106)
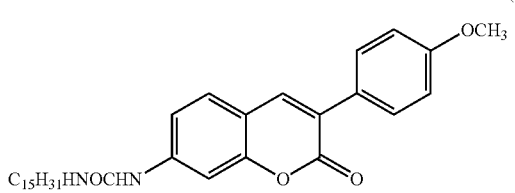
(III-107)

-continued
(III-108)
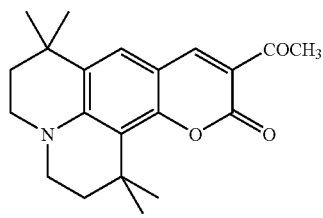
(III-109)
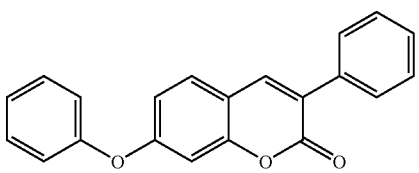
(III-110)
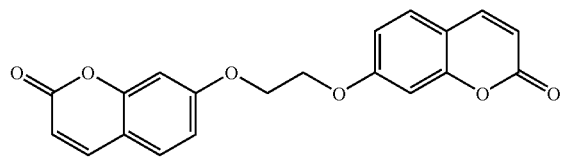
(III-111)
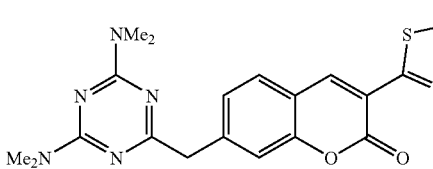
(III-112)
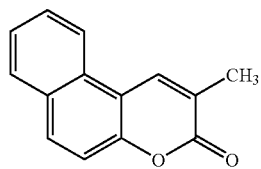
(III-113)
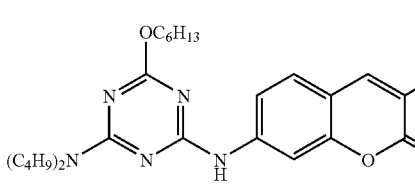
(III-114)
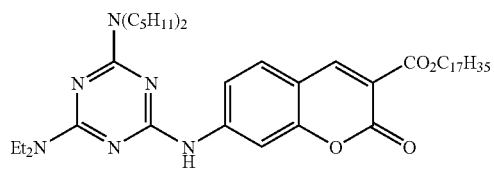
(III-115)
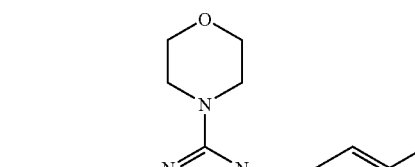
(III-116)
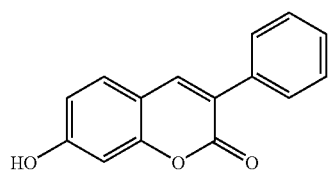
(III-117)
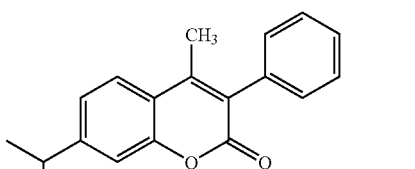
(III-118)
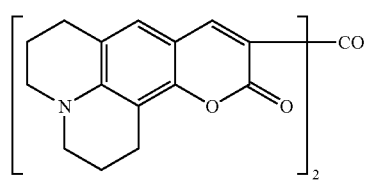
(III-119)
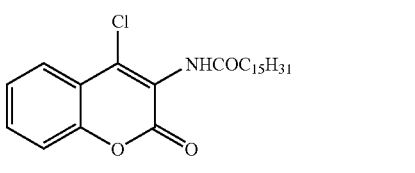
(III-120)
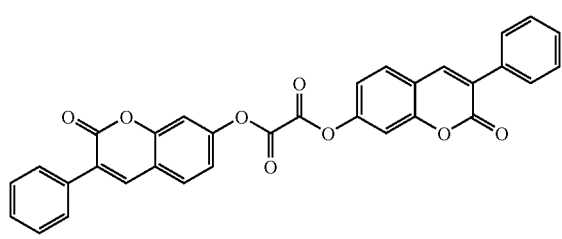
(III-121)
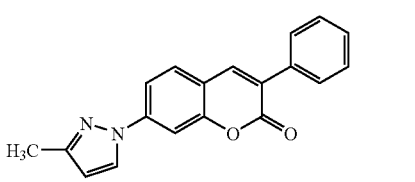

-continued
(III-122)
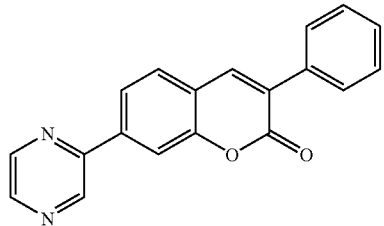
(III-123)
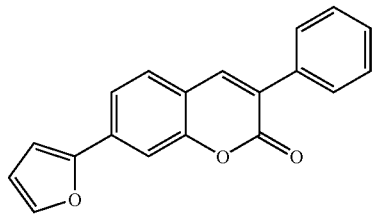
(III-124)
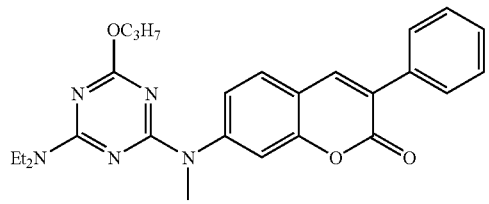
(III-125)
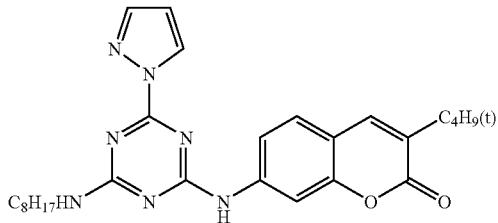
(III-126)
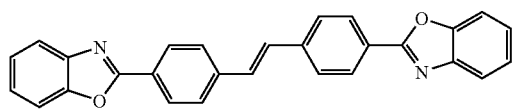
(III-127)
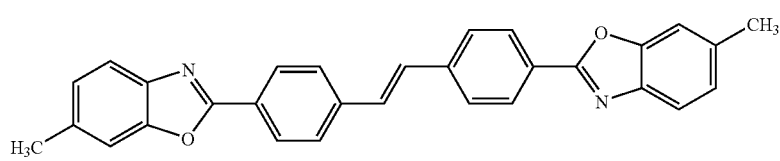
(III-128)
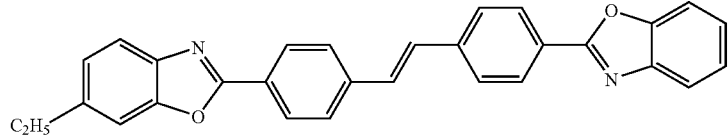
(III-129)
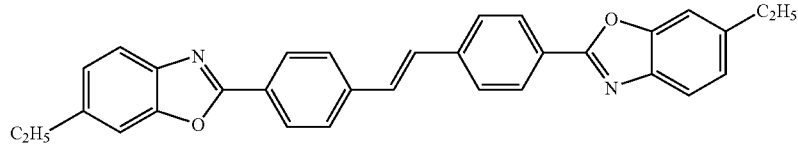
(III-130)
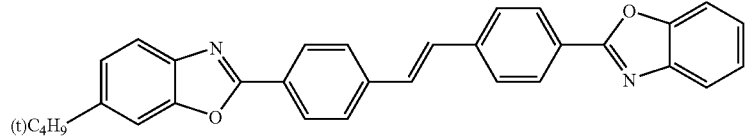
(III-131)
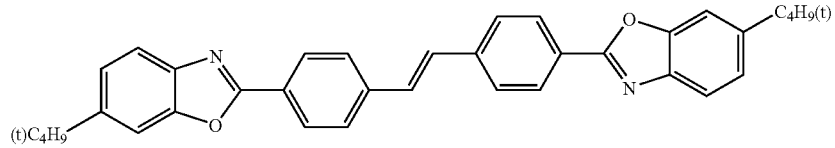
(III-132)
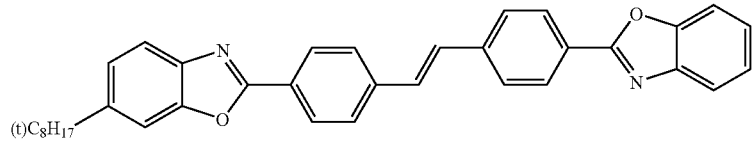
(III-133)

-continued
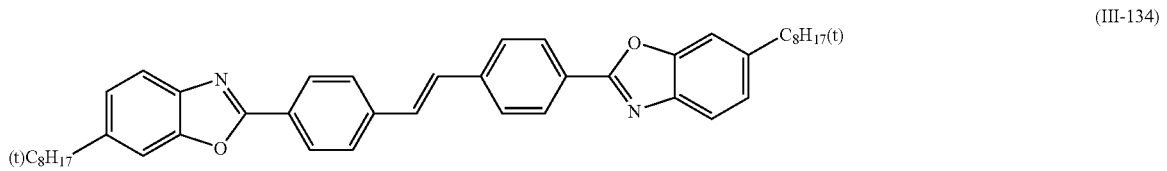
(III-134)
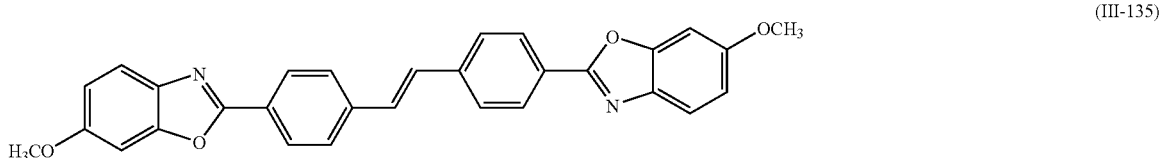
(III-135)
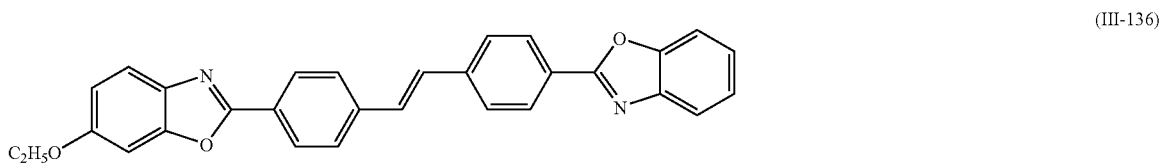
(III-136)
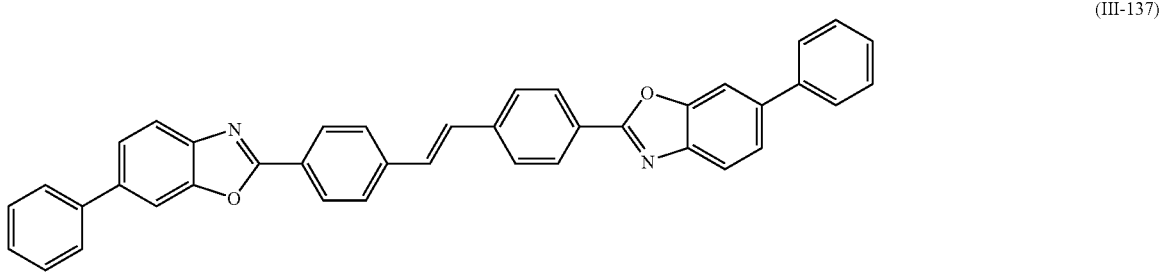
(III-137)
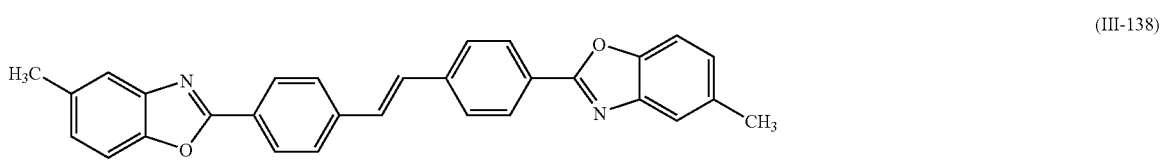
(III-138)
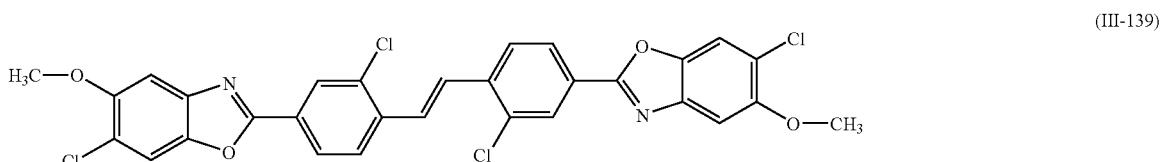
(III-139)
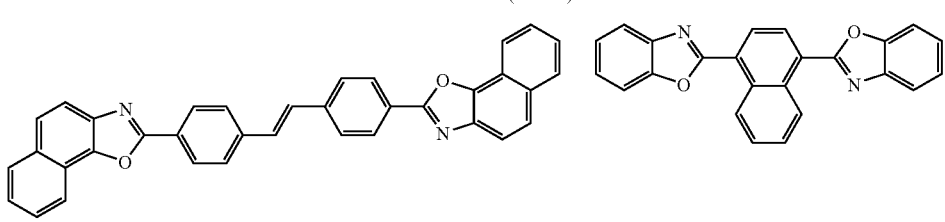
(III-140)　(III-141)
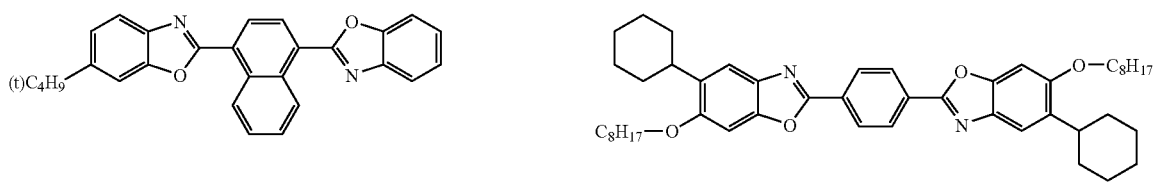
(III-142)　(III-143)

-continued
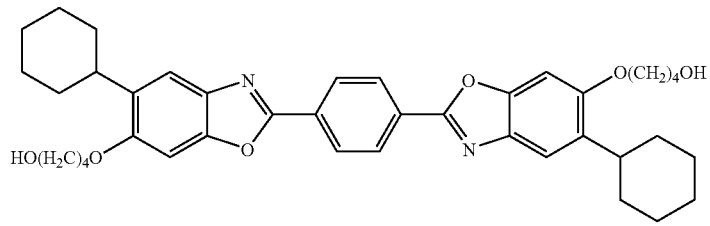
(III-144)
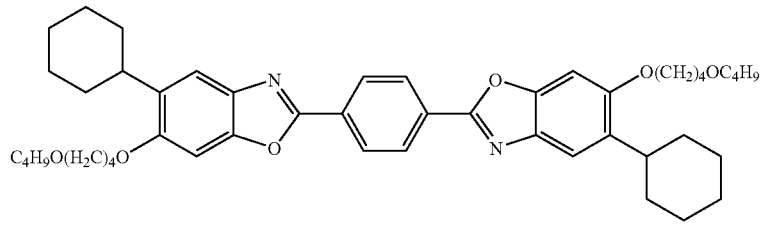
(III-145)
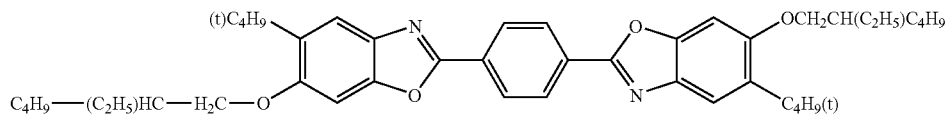
(III-146)
(III-147)
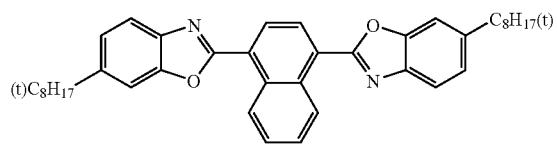
(III-148)
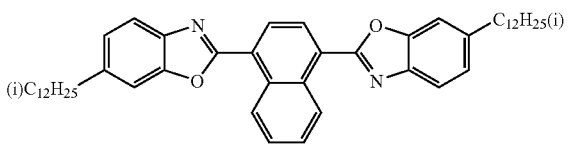
(III-149)
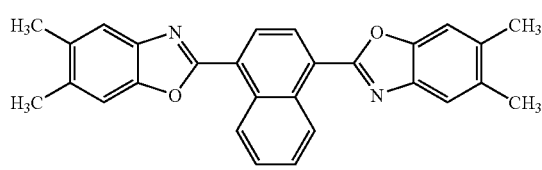
(III-150)
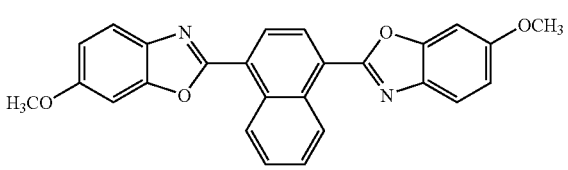
(III-151)
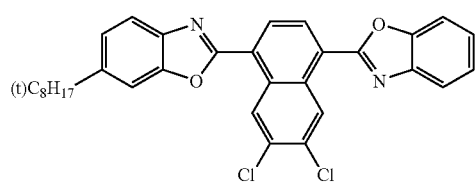
(III-152)
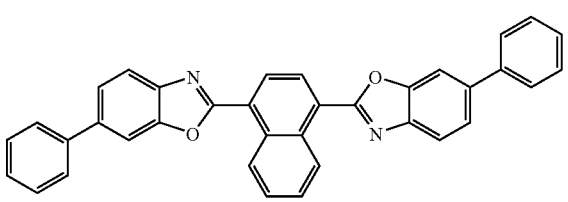
(III-153)
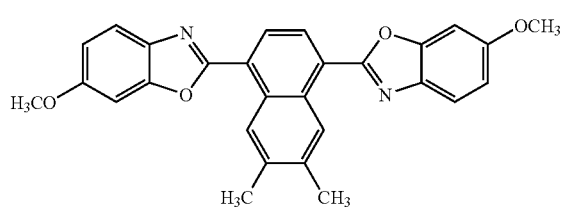
(III-154)
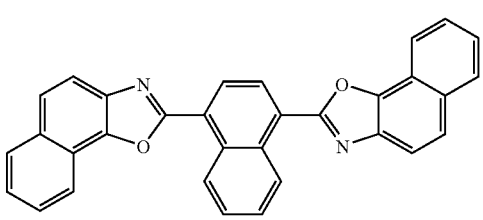
(III-155)
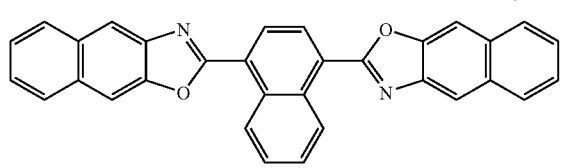
(III-156)
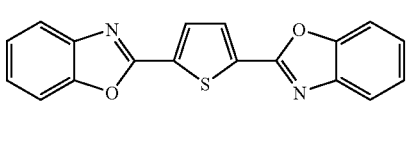

-continued

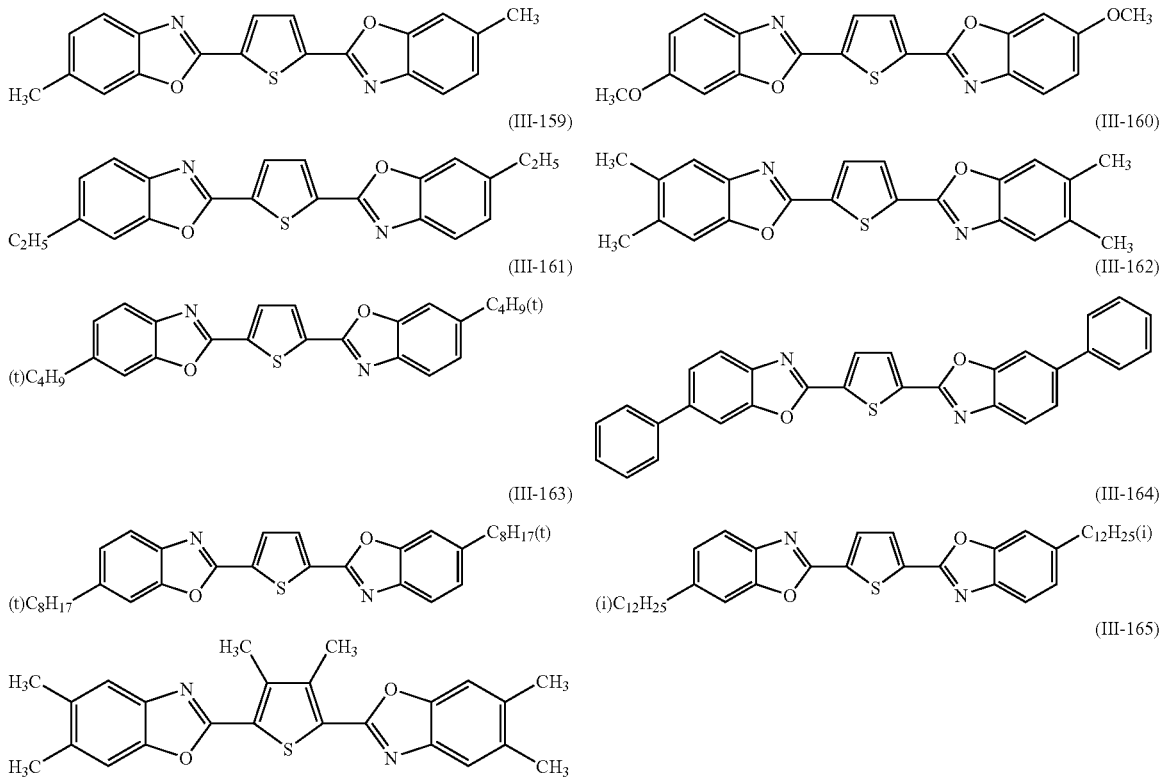

These compounds can be easily synthesized by methods described in JP-B No. 50-25337, U.S. Pat. No. 3,785,827, JP-A No. 5-4449, JP-B No. 48-30492, JP-A No. 2-188573, EP0684278A1, and Journal of Organic Chemistry, vol. 23, p. 1344 (1958), or by modifications thereto. These compounds are marketed under the trade name Tinuvin 109 from Ciba Specialty Chemicals or can be selected from products under the trade name Whitwefuluor from Sumitomo Chemical Co., Ltd., products under the trade name Hakkol from Showa Kagaku Co., Ltd., products under the trade name Hostalux from Hoechst, and products under the trade name Kayalight from Nippon Kayaku Co., Ltd.

The near-infrared-absorbing material of the invention preferably contains two or more kinds of the ultraviolet-absorbing compounds described above. By doing so, light resistance can be more effectively improved.

The total number of moles of the ultraviolet-absorbing compounds contained in the near-infrared-absorbing material of the invention is preferably 0.05 to 2.0, more preferably 0.1 to 1.0, still more preferably 0.1 to 0.5 mole, per mole of the compound (II). When the content of the ultraviolet-absorbing compounds is in these ranges, light resistance can be more effectively improved, and infrared absorption performance and less discoloration after light deterioration can be simultaneously easily achieved.

(Method for Manufacturing the Near-Infrared-Absorbing Material)

The near-infrared-absorbing material of the invention can be prepared for example by the following methods:

(1) a method which involves dissolving or dispersing the compound (I) and the compound (II) in a solvent (for example, chloroform, methylene chloride, toluene, acetone, methyl ethyl ketone, cyclohexanone, ethyl acetate, dibutyl ether, tetrahydrofuran, dimethylformamide, water etc.);

(2) a method which involves heating and kneading the compound (I) and the compound (II) in a resin (for example, ABS resin, polyethylene resin, polypropylene resin, polyvinyl chloride resin, polycarbonate resin, polystyrene resin, polyacrylonitrile resin, methacrylonitrile resin, polymethacrylate resin or polyester resin);

(3) a method which involves dissolving or dispersing the compound (I) and the compound (II) in the above-mentioned solvent, then adding the above-mentioned resin for example, melting the mixture by heating, and optionally forming it into a thin film, followed by solidification thereof;

(4) a method which involves dissolving or dispersing the compound (I) and the compound (II) in the solvent and then applying or hard-coating it onto for example a paper, resin sheet, resin, film, glass or metal plate; and (5) a method which involves polymerizing, as a monomer mixture, the compound (I) and the compound (II) as they are or in the form of fine particles or solution.

In each of the above methods, the ultraviolet-absorbing compound is preferably further added. If necessary, a binder or other compounds can also be used.

(Usage of the Near-Infrared-Absorbing Material)

The near-infrared-absorbing material of the invention can be used in various applications. That is, the near-infrared-absorbing material can be used in an optical recording medium for long-wavelength laser, a recording material for invisible printing, an optical filter, a filter for building or agriculture, a coating material, etc. Among these applications, the near-infrared-absorbing material is applied preferably to an optical filter, a filter for building or agriculture, and a coating material, more preferably to an optical filter.

The near-infrared-absorbing material of the invention contains the compound (I) and the compound (II) and can thus simultaneously achieve light resistance, infrared absorption performance and less discoloration after light deterioration and can also be expected for use in new applications.

<Near-Infrared-Absorbing Filter>

The near-infrared-absorbing filter of the invention is characterized by being provided with the near-infrared-absorbing material of the invention. The near-infrared-absorbing filter of the invention can also be produced by the method described in reference to the method for manufacturing the near-infrared-absorbing material. If necessary, other layers such as a protective layer can be further arranged.

EXAMPLES

Hereinafter, the present invention is described in more detail by reference to the Examples, but the invention is not limited to the following examples.

For the sake of description, specific examples of the compound (I), the compound (II), and the ultraviolet-absorbing compound are referred to as compound (I-a), compound (II-a), and compound (III-a), respectively. In the table below, "Structure" indicates the corresponding exemplary compound number.

Example 1

Preparation of Near-Infrared-Absorbing Filter 100 ml chloroform was added to 10 g polystyrene, compounds (I-a) and (III-a) whose structures and amounts are shown in Tables 1 and 2 below, and 0.1 g exemplary compound (II-22), then the materials were dissolved under stirring at 40° C. for 15 minutes, and the resulting solutions were applied onto glass plates and dried by air blowing at room temperature to prepare samples.

(Light Resistance Test)

The samples obtained in Example 1 were irradiated for 3 days with 95,000-lux light from a xenon lamp and then measured for absorbance in the spectral absorption maximum wavelength of the exemplary compound (II-22) to determine the residual ratio to the absorbance in the spectral absorption maximum wavelength before irradiation, whereby the light resistance (light fastness) was evaluated. The results are shown in Tables 1 and 2.

TABLE 1

| Test No. | Compound (I-a) | | Compound (III-a) | | Light resistance | Remarks |
| | Structure | (Molar ratio to II-22) | Structure | (Molar ratio to II-22) | | |
| --- | --- | --- | --- | --- | --- | --- |
| 101 | not added | | not added | | 0.06 | Comparative Example |
| 102 | (I-1) | 0.01 | not added | | 0.07 | The Invention |
| 103 | (I-1) | 0.05 | not added | | 0.10 | The Invention |
| 104 | (I-1) | 0.1 | not added | | 0.35 | The Invention |
| 105 | (I-1) | 0.3 | not added | | 0.48 | The Invention |
| 106 | (I-1) | 0.5 | not added | | 0.56 | The Invention |
| 107 | (I-1) | 1 | not added | | 0.63 | The Invention |
| 108 | (I-10) | 0.01 | not added | | 0.07 | The Invention |
| 109 | (I-10) | 0.05 | not added | | 0.13 | The Invention |
| 110 | (I-10) | 0.1 | not added | | 0.30 | The Invention |
| 111 | (I-10) | 0.3 | not added | | 0.45 | The Invention |
| 112 | (I-10) | 0.5 | not added | | 0.52 | The Invention |
| 113 | (I-10) | 1 | not added | | 0.55 | The Invention |
| 114 | (I-33) | 0.01 | not added | | 0.08 | The Invention |
| 115 | (I-33) | 0.05 | not added | | 0.13 | The Invention |
| 116 | (I-33) | 0.1 | not added | | 0.31 | The Invention |
| 117 | (I-33) | 0.3 | not added | | 0.42 | The Invention |
| 118 | (I-33) | 0.5 | not added | | 0.50 | The Invention |
| 119 | (I-33) | 1 | not added | | 0.60 | The Invention |
| 120 | (I-39) | 0.01 | not added | | 0.08 | The Invention |
| 121 | (I-39) | 0.05 | not added | | 0.09 | The Invention |
| 122 | (I-39) | 0.1 | not added | | 0.30 | The Invention |
| 123 | (I-39) | 0.3 | not added | | 0.35 | The Invention |
| 124 | (I-39) | 0.5 | not added | | 0.39 | The Invention |
| 125 | (I-39) | 1 | not added | | 0.43 | The Invention |
| 126 | (I-1)/(I-39) | 0.005 each | not added | | 0.08 | The Invention |
| 127 | (I-1)/(I-39) | 0.025 each | not added | | 0.15 | The Invention |
| 128 | (I-1)/(I-39) | 0.05 each | not added | | 0.42 | The Invention |
| 129 | (I-1)/(I-39) | 0.15 each | not added | | 0.55 | The Invention |
| 130 | (I-1)/(I-39) | 0.25 each | not added | | 0.62 | The Invention |
| 131 | (I-1)/(I-39) | 0.5 each | not added | | 0.70 | The Invention |

TABLE 2

| Test No. | Compound (I-a) Structure | Compound (I-a) (Molar ratio to II-22) | Compound (III-a) Structure | Compound (III-a) (Molar ratio to II-22) | Light resistance | Remarks |
|---|---|---|---|---|---|---|
| 132 | (I-1) | 0.005 | (III-9) | 0.005 | 0.07 | The Invention |
| 133 | (I-1) | 0.025 | (III-9) | 0.025 | 0.12 | The Invention |
| 134 | (I-1) | 0.05 | (III-9) | 0.05 | 0.44 | The Invention |
| 135 | (I-1) | 0.15 | (III-9) | 0.15 | 0.58 | The Invention |
| 136 | (I-1) | 0.25 | (III-9) | 0.25 | 0.60 | The Invention |
| 137 | (I-1) | 0.5 | (III-9) | 0.5 | 0.68 | The Invention |
| 138 | (I-1) | 0.005 | (III-41) | 0.005 | 0.07 | The Invention |
| 139 | (I-1) | 0.025 | (III-41) | 0.025 | 0.13 | The Invention |
| 140 | (I-1) | 0.05 | (III-41) | 0.05 | 0.48 | The Invention |
| 141 | (I-1) | 0.15 | (III-41) | 0.15 | 0.63 | The Invention |
| 142 | (I-1) | 0.25 | (III-41) | 0.25 | 0.69 | The Invention |
| 143 | (I-1) | 0.5 | (III-41) | 0.5 | 0.74 | The Invention |
| 144 | (I-10) | 0.005 | (III-71) | 0.005 | 0.07 | The Invention |
| 145 | (I-10) | 0.025 | (III-71) | 0.025 | 0.11 | The Invention |
| 146 | (I-10) | 0.05 | (III-71) | 0.05 | 0.45 | The Invention |
| 147 | (I-10) | 0.15 | (III-71) | 0.15 | 0.55 | The Invention |
| 148 | (I-10) | 0.25 | (III-71) | 0.25 | 0.61 | The Invention |
| 149 | (I-10) | 0.5 | (III-71) | 0.5 | 0.68 | The Invention |
| 150 | (I-10) | 0.005 | (III-138) | 0.005 | 0.07 | The Invention |
| 151 | (I-10) | 0.025 | (III-138) | 0.025 | 0.10 | The Invention |
| 152 | (I-10) | 0.05 | (III-138) | 0.05 | 0.40 | The Invention |
| 153 | (I-10) | 0.15 | (III-138) | 0.15 | 0.48 | The Invention |
| 154 | (I-10) | 0.25 | (III-138) | 0.25 | 0.59 | The Invention |
| 155 | (I-10) | 0.5 | (III-138) | 0.5 | 0.71 | The Invention |
| 156 | (I-1)/(I-39) | 0.0025 each | (III-9) | 0.005 | 0.08 | The Invention |
| 157 | (I-1)/(I-39) | 0.0125 each | (III-9) | 0.025 | 0.18 | The Invention |
| 158 | (I-1)/(I-39) | 0.025 each | (III-9) | 0.05 | 0.47 | The Invention |
| 159 | (I-1)/(I-39) | 0.075 each | (III-9) | 0.15 | 0.65 | The Invention |
| 160 | (I-1)/(I-39) | 0.125 each | (III-9) | 0.25 | 0.73 | The Invention |
| 161 | (I-1)/(I-39) | 0.25 each | (III-9) | 0.5 | 0.75 | The Invention |
| 162 | (I-1)/(I-39) | 0.0025 each | (III-9)/(III-41) | 0.0025 each | 0.08 | The Invention |
| 163 | (I-1)/(I-39) | 0.0125 each | (III-9)/(III-41) | 0.0125 each | 0.23 | The Invention |
| 164 | (I-1)/(I-39) | 0.025 each | (III-9)/(III-41) | 0.025 each | 0.50 | The Invention |
| 165 | (I-1)/(I-39) | 0.075 each | (III-9)/(III-41) | 0.075 each | 0.74 | The Invention |
| 166 | (I-1)/(I-39) | 0.125 each | (III-9)/(III-41) | 0.125 each | 0.75 | The Invention |
| 167 | (I-1)/(I-39) | 0.25 each | (III-9)/(III-41) | 0.25 each | 0.76 | The Invention |

As shown in Tables 1 and 2 above, any samples of the invention show excellent light resistance, and their effect is particularly outstanding. After the test, any samples of the invention when visually checked had a paler brown color than that of the comparative samples.

Example 2

Preparation of Near-Infrared-Absorbing Filter 100 ml chloroform was added to 10 g polystyrene, compounds (I-a) and (III-a) whose structures and amounts are shown in Tables 3 and 4 below, and 0.1 g compound (II-a) having a structure shown in Tables 3 and 4 below, then the materials were dissolved under stirring at 40° C. for 15 minutes, and the resulting solutions were applied onto glass plates and dried by air blowing at room temperature to prepare samples.

(Light Resistance Test)

The samples obtained in Example 2 were irradiated for 3 days with 95,000-lux light from a xenon lamp and then measured for absorbance in the spectral absorption maximum wavelength of the compound (II-a) to determine the residual ratio to the absorbance in the spectral absorption maximum wavelength before irradiation, whereby the light resistance (light fastness) was evaluated. The results are shown in Tables 3 and 4.

TABLE 3

| Test No. | Compound (I-a) Structure | Compound (I-a) (Molar ratio to II-a) | Compound (III-a) Structure | Compound (III-a) (Molar ratio to II-a) | Compound (II-a) Structure | Light resistance | Remarks |
|---|---|---|---|---|---|---|---|
| 200 | not added | | not added | | (II-4) | 0.05 | Comparative Example |
| 201 | (I-1) | 0.01 | not added | | (II-4) | 0.07 | The Invention |
| 202 | (I-1) | 0.05 | not added | | (II-4) | 0.08 | The Invention |
| 203 | (I-1) | 0.1 | not added | | (II-4) | 0.18 | The Invention |

TABLE 3-continued

| | Compound (I-a) | | Compound (III-a) | | Compound | | |
|---|---|---|---|---|---|---|---|
| Test No. | Structure | (Molar ratio to II-a) | Structure | (Molar ratio to II-a) | (II-a) Structure | Light resistance | Remarks |
| 204 | (I-1) | 0.3 | not added | | (II-4) | 0.33 | The Invention |
| 205 | (I-1) | 0.5 | not added | | (II-4) | 0.39 | The Invention |
| 206 | (I-1) | 1 | not added | | (II-4) | 0.44 | The Invention |
| 207 | (I-1) | 0.005 | (III-47) | 0.005 | (II-4) | 0.06 | The Invention |
| 208 | (I-1) | 0.025 | (III-47) | 0.025 | (II-4) | 0.09 | The Invention |
| 209 | (I-1) | 0.05 | (III-47) | 0.05 | (II-4) | 0.30 | The Invention |
| 210 | (I-1) | 0.15 | (III-47) | 0.15 | (II-4) | 0.36 | The Invention |
| 211 | (I-1) | 0.25 | (III-47) | 0.25 | (II-4) | 0.45 | The Invention |
| 212 | (I-1) | 0.5 | (III-47) | 0.5 | (II-4) | 0.50 | The Invention |
| 213 | (I-2) | 0.01 | not added | | (II-4) | 0.07 | The Invention |
| 214 | (I-2) | 0.05 | not added | | (II-4) | 0.08 | The Invention |
| 215 | (I-2) | 0.1 | not added | | (II-4) | 0.15 | The Invention |
| 216 | (I-2) | 0.3 | not added | | (II-4) | 0.26 | The Invention |
| 217 | (I-2) | 0.5 | not added | | (II-4) | 0.31 | The Invention |
| 218 | (I-2) | 1 | not added | | (II-4) | 0.35 | The Invention |
| 219 | (I-2) | 0.005 | (III-126) | 0.005 | (II-4) | 0.07 | The Invention |
| 220 | (I-2) | 0.025 | (III-126) | 0.025 | (II-4) | 0.10 | The Invention |
| 221 | (I-2) | 0.05 | (III-126) | 0.05 | (II-4) | 0.35 | The Invention |
| 222 | (I-2) | 0.15 | (III-126) | 0.15 | (II-4) | 0.40 | The Invention |
| 223 | (I-2) | 0.25 | (III-126) | 0.25 | (II-4) | 0.48 | The Invention |
| 224 | (I-2) | 0.5 | (III-126) | 0.5 | (II-4) | 0.50 | The Invention |
| 225 | (I-20) | 0.01 | not added | | (II-4) | 0.07 | The Invention |
| 226 | (I-20) | 0.05 | not added | | (II-4) | 0.10 | The Invention |
| 227 | (I-20) | 0.1 | not added | | (II-4) | 0.18 | The Invention |
| 228 | (I-20) | 0.3 | not added | | (II-4) | 0.25 | The Invention |
| 229 | (I-20) | 0.5 | not added | | (II-4) | 0.31 | The Invention |
| 230 | (I-20) | 1 | not added | | (II-4) | 0.37 | The Invention |
| 231 | (I-20) | 0.005 | (III-9) | 0.005 | (II-4) | 0.07 | The Invention |
| 232 | (I-20) | 0.025 | (III-9) | 0.025 | (II-4) | 0.12 | The Invention |
| 233 | (I-20) | 0.05 | (III-9) | 0.05 | (II-4) | 0.26 | The Invention |
| 234 | (I-20) | 0.15 | (III-9) | 0.15 | (II-4) | 0.34 | The Invention |
| 235 | (I-20) | 0.25 | (III-9) | 0.25 | (II-4) | 0.40 | The Invention |
| 236 | (I-20) | 0.5 | (III-9) | 0.5 | (II-4) | 0.45 | The Invention |
| 237 | (I-20)/(I-36) | 0.005 each | not added | | (II-4) | 0.07 | The Invention |
| 238 | (I-20)/(I-36) | 0.025 each | not added | | (II-4) | 0.10 | The Invention |
| 239 | (I-20)/(I-36) | 0.05 each | not added | | (II-4) | 0.27 | The Invention |
| 240 | (I-20)/(I-36) | 0.15 each | not added | | (II-4) | 0.34 | The Invention |

TABLE 3-continued

| Test No. | Compound (I-a) Structure | (Molar ratio to II-a) | Compound (III-a) Structure | (Molar ratio to II-a) | Compound (II-a) Structure | Light resistance | Remarks |
|---|---|---|---|---|---|---|---|
| 241 | (I-20)/(I-36) | 0.25 each | not added | | (II-4) | 0.36 | The Invention |
| 242 | (I-20)/(I-36) | 0.5 each | not added | | (II-4) | 0.38 | The Invention |
| 243 | (I-20)/(I-36) | 0.0025 each | (III-9) | 0.005 | (II-4) | 0.07 | The Invention |
| 244 | (I-20)/(I-36) | 0.0125 each | (III-9) | 0.025 | (II-4) | 0.17 | The Invention |
| 245 | (I-20)/(I-36) | 0.025 each | (III-9) | 0.05 | (II-4) | 0.39 | The Invention |
| 246 | (I-20)/(I-36) | 0.075 each | (III-9) | 0.15 | (II-4) | 0.45 | The Invention |
| 247 | (I-20)/(I-36) | 0.125 each | (III-9) | 0.25 | (II-4) | 0.48 | The Invention |
| 248 | (I-20)/(I-36) | 0.25 each | (III-9) | 0.5 | (II-4) | 0.52 | The Invention |
| 249 | (I-20)/(I-36) | 0.0025 each | (III-9)/(III-47) | 0.0025 each | (II-4) | 0.07 | The Invention |
| 250 | (I-20)/(I-36) | 0.0125 each | (III-9)/(III-47) | 0.0125 each | (II-4) | 0.28 | The Invention |
| 251 | (I-20)/(I-36) | 0.025 each | (III-9)/(III-47) | 0.025 each | (II-4) | 0.45 | The Invention |
| 252 | (I-20)/(I-36) | 0.075 each | (III-9)/(III-47) | 0.075 each | (II-4) | 0.48 | The Invention |
| 253 | (I-20)/(I-36) | 0.125 each | (III-9)/(III-47) | 0.125 each | (II-4) | 0.52 | The Invention |
| 254 | (I-20)/(I-36) | 0.25 each | (III-9)/(III-47) | 0.25 each | (II-4) | 0.54 | The Invention |

TABLE 4

| Test No. | Compound (I-a) Structure | (Molar ratio to II-a) | Compound (III-a) Structure | (Molar ratio to II-a) | Compound (II-a) Structure | Light resistance | Remarks |
|---|---|---|---|---|---|---|---|
| 255 | not added | | not added | | (II-18) | 0.06 | Comparative Example |
| 256 | (I-52) | 0.01 | not added | | (II-18) | 0.07 | The Invention |
| 257 | (I-52) | 0.05 | not added | | (II-18) | 0.08 | The Invention |
| 258 | (I-52) | 0.1 | not added | | (II-18) | 0.16 | The Invention |
| 259 | (I-52) | 0.3 | not added | | (II-18) | 0.29 | The Invention |
| 260 | (I-52) | 0.5 | not added | | (II-18) | 0.34 | The Invention |
| 261 | (I-52) | 1 | not added | | (II-18) | 0.38 | The Invention |
| 262 | (I-52) | 0.005 | (III-9) | 0.005 | (II-18) | 0.08 | The Invention |
| 263 | (I-52) | 0.025 | (III-9) | 0.025 | (II-18) | 0.12 | The Invention |
| 264 | (I-52) | 0.05 | (III-9) | 0.05 | (II-18) | 0.28 | The Invention |
| 265 | (I-52) | 0.15 | (III-9) | 0.15 | (II-18) | 0.38 | The Invention |
| 266 | (I-52) | 0.25 | (III-9) | 0.25 | (II-18) | 0.46 | The Invention |
| 267 | (I-52) | 0.5 | (III-9) | 0.5 | (II-18) | 0.49 | The Invention |
| 268 | not added | | not added | | (II-24) | 0.06 | Comparative Example |
| 269 | (I-48) | 0.01 | not added | | (II-24) | 0.07 | The Invention |
| 270 | (I-48) | 0.05 | not added | | (II-24) | 0.08 | The Invention |
| 271 | (I-48) | 0.1 | not added | | (II-24) | 0.15 | The Invention |

TABLE 4-continued

| Test No. | Compound (I-a) Structure | Compound (I-a) (Molar ratio to II-a) | Compound (III-a) Structure | Compound (III-a) (Molar ratio to II-a) | Compound (II-a) Structure | Light resistance | Remarks |
|---|---|---|---|---|---|---|---|
| 272 | (I-48) | 0.3 | not added | | (II-24) | 0.27 | The Invention |
| 273 | (I-48) | 0.5 | not added | | (II-24) | 0.33 | The Invention |
| 274 | (I-48) | 1 | not added | | (II-24) | 0.35 | The Invention |
| 275 | (I-48) | 0.005 | (III-9) | 0.005 | (II-24) | 0.07 | The Invention |
| 276 | (I-48) | 0.025 | (III-9) | 0.025 | (II-24) | 0.10 | The Invention |
| 277 | (I-48) | 0.05 | (III-9) | 0.05 | (II-24) | 0.22 | The Invention |
| 278 | (I-48) | 0.15 | (III-9) | 0.15 | (II-24) | 0.36 | The Invention |
| 279 | (I-48) | 0.25 | (III-9) | 0.25 | (II-24) | 0.40 | The Invention |
| 280 | (I-48) | 0.5 | (III-9) | 0.5 | (II-24) | 0.42 | The Invention |
| 281 | (I-48) | 0.005 | (III-9)/(III-11) | 0.0025 each | (II-24) | 0.07 | The Invention |
| 282 | (I-48) | 0.025 | (III-9)/(III-11) | 0.0125 each | (II-24) | 0.11 | The Invention |
| 283 | (I-48) | 0.05 | (III-9)/(III-11) | 0.025 each | (II-24) | 0.29 | The Invention |
| 284 | (I-48) | 0.15 | (III-9)/(III-11) | 0.075 each | (II-24) | 0.42 | The Invention |
| 285 | (I-48) | 0.25 | (III-9)/(III-11) | 0.125 each | (II-24) | 0.45 | The Invention |
| 286 | (I-48) | 0.5 | (III-9)/(III-11) | 0.25 each | (II-24) | 0.46 | The Invention |
| 287 | (I-36) | 0.01 | not added | | (II-24) | 0.07 | The Invention |
| 288 | (I-36) | 0.05 | not added | | (II-24) | 0.08 | The Invention |
| 289 | (I-36) | 0.1 | not added | | (II-24) | 0.12 | The Invention |
| 290 | (I-36) | 0.3 | not added | | (II-24) | 0.22 | The Invention |
| 291 | (I-36) | 0.5 | not added | | (II-24) | 0.27 | The Invention |
| 292 | (I-36) | 1 | not added | | (II-24) | 0.29 | The Invention |
| 293 | (I-36)/(I-48) | 0.0025 each | (III-9)/(III-11) | 0.0025 each | (II-24) | 0.08 | The Invention |
| 294 | (I-36)/(I-48) | 0.0125 each | (III-9)/(III-11) | 0.0125 each | (II-24) | 0.16 | The Invention |
| 295 | (I-36)/(I-48) | 0.025 each | (III-9)/(III-11) | 0.025 each | (II-24) | 0.38 | The Invention |
| 296 | (I-36)/(I-48) | 0.075 each | (III-9)/(III-11) | 0.075 each | (II-24) | 0.46 | The Invention |
| 297 | (I-36)/(I-48) | 0.125 each | (III-9)/(III-11) | 0.125 each | (II-24) | 0.52 | The Invention |
| 298 | (I-36)/(I-48) | 0.25 each | (III-9)/(III-11) | 0.25 each | (II-24) | 0.57 | The Invention |

As shown in Tables 3 and 4 above, any samples of the invention, examined by changing the compound (II-a), show excellent light resistance, and their effect is particularly outstanding. After the test, any samples of the invention when visually checked had a paler brown color than that of the comparative samples.

Physical properties of the compounds used in the Examples in the invention are shown below.

TABLE 5

| Compound | λ max (ε) | Measurement condition |
|---|---|---|
| I-1 | 278.5 nm | methanol |
| II-4 | 806 nm | methanol |
| II-18 | 832 nm | N,N-dimethylformamide |
| II-22 | 847 nm | tetrahydrofuran |

TABLE 5-continued

| Compound | λ max (ε) | Measurement condition |
|---|---|---|
| II-24 | 828 nm | N,N-dimethylformamide |
| III-9 | 349.7 nm (1.52 × 10$^4$) | ethyl acetate |
| III-11 | 348 nm (1.67 × 10$^4$) | ethyl acetate |
| III-41 | 351.9 nm (1.91 × 10$^4$) | ethyl acetate |
| III-47 | 353.1 nm (2.01 × 10$^4$) | ethyl acetate |
| III-71 | 299.8 nm (1.28 × 10$^4$) | ethyl acetate |
| III-126 | 368.7 nm (2.55 × 10$^4$) | ethyl acetate |
| III-138 | 377 nm (8.63 × 10$^4$) | chloroform |

TABLE 6

| Compound | Mass spectrum (M/E) |
|---|---|
| I-1 | 530 |
| I-2 | 1176 |
| I-10 | 474 |
| I-20 | 325 |
| I-33 | 904 |
| I-36 | 508 |
| I-39 | 566 |
| I-48 | 340 |
| I-52 | 508 |

According to the invention, there can be provided a near-infrared-absorbing material that simultaneously achieves light resistance, near-infrared absorption performance, and less discoloration after light deterioration, as well as a near-infrared-absorbing filter provided with the near-infrared-absorbing material.

The invention also includes the following embodiments.

<1> A near-infrared-absorbing material comprising at least one first compound selected from the group consisting of a singlet oxygen scavenger, a radical trapping agent and an antioxidant and at least one second compound represented by the following formula (II-1) or (II-2):

formula (II-1)

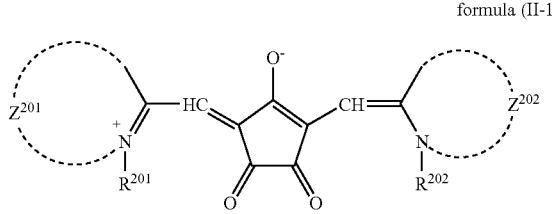

formula (II-2)

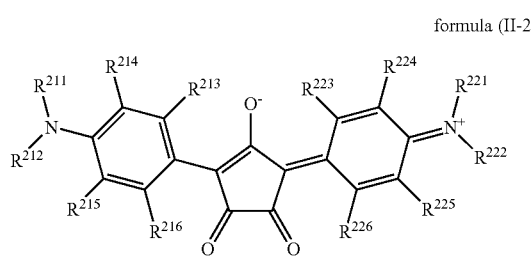

wherein $R^{201}$, $R^{202}$, $R^{211}$, $R^{212}$, $R^{221}$ and $R^{222}$ each independently represents a hydrogen atom, an aliphatic group, an aromatic group, or a heterocyclic group bound via a carbon atom; $Z^{201}$ and $Z^{202}$ each represents a nonmetallic atomic group necessary for forming a nitrogen-containing heterocycle; $R^{213}$ to $R^{216}$ and $R^{223}$ to $R^{226}$ each represents a hydrogen atom or a substituent group; and $R^{213}$ and $R^{214}$, $R^{214}$ and $R^{211}$, $R^{211}$ and $R^{212}$, $R^{212}$ and $R^{215}$, $R^{215}$ and $R^{216}$, $R^{223}$ and $R^{224}$, $R^{224}$ and $R^{221}$, $R^{221}$ and $R^{222}$, $R^{222}$ and $R^{225}$, and $R^{225}$ and $R^{226}$ may be bound to each other to form a ring.

<2> The near-infrared-absorbing material of item <1>, wherein the at least one first compound is represented by the following formula (I-1) or (I-2):

formula (I-1)

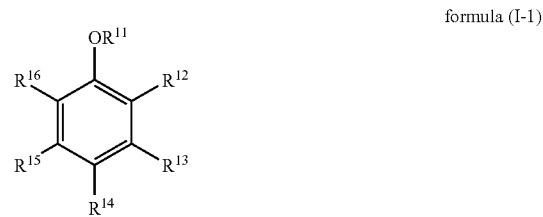

formula (I-2)

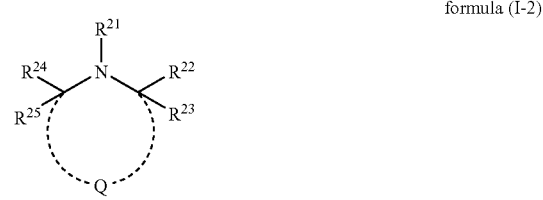

wherein $R^{11}$ represents a hydrogen atom, an aliphatic group, an aromatic group, a heterocyclic group bound via a carbon atom, or a hydrolysable protective group; $R^{12}$ to $R^{16}$ each independently represents a hydrogen atom or a substituent group; $R^{11}$ and $R^{12}$, $R^{12}$ and $R^{13}$, $R^{13}$ and $R^{14}$, $R^{14}$ and $R^{15}$, $R^{15}$ and $R^{16}$, and $R^{16}$ and $R^{11}$ may be bound to each other to form a ring; $R^{21}$ represents a hydrogen atom, an aliphatic group, an acyl group, an alkyl or aryl sulfonyl group, an alkyl or aryl sulfinyl group, an oxy radical group or a hydroxyl group; Q represents a nonmetallic atomic group necessary for forming a 5-, 6- or 7-membered ring; $R^{22}$ to $R^{25}$ each independently represents a hydrogen atom, an aliphatic group, an aromatic group, or a heterocyclic group bound via a carbon atom; and $R^{21}$ and $R^{22}$, $R^{22}$ and $R^{23}$, $R^{24}$ and $R^{25}$, and $R^{21}$ and $R^{24}$ may be bound to each other to form a ring.

<3> The near-infrared-absorbing material of item <1> or <2>, which comprises two or more of the at least one first compound.

<4> The near-infrared-absorbing material of any one of items <1> to <3>, which further comprises at least one ultraviolet-absorbing compound.

<5> The near-infrared-absorbing material of item <4>, wherein the spectral absorption maximum wavelength, in a range of from 270 to 1600 nm, of the ultraviolet-absorbing compound in solution is 410 nm or less.

<6> The near-infrared-absorbing material of item <4> or <5>, wherein the ultraviolet-absorbing compound is a compound represented by any of the following formulae (III-1) to (III-9):

formula (III-1)

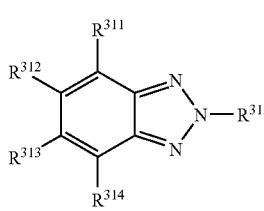

formula (III-2)

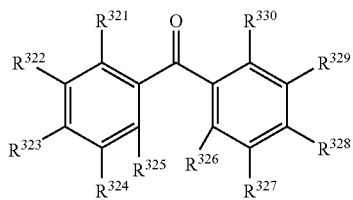

formula (III-3)

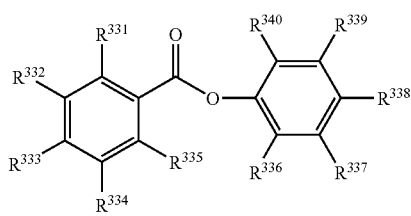

formula (III-4)

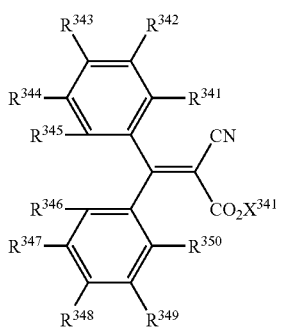

formula (III-5)

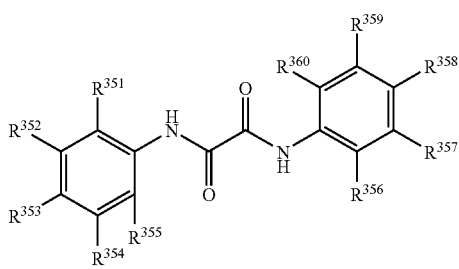

formula (III-6)

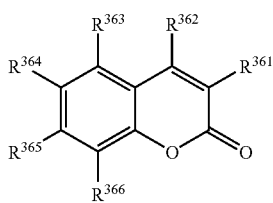

formula (III-7)

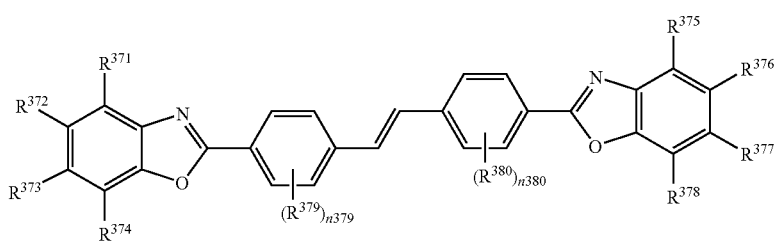

formula (III-8)

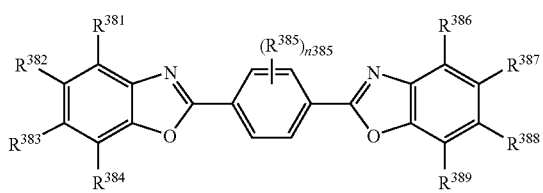

formula (III-9)

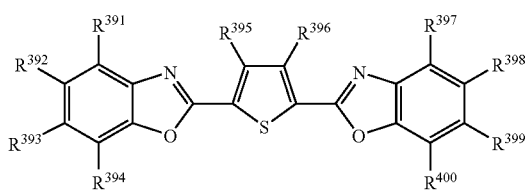

wherein $R^{311}$ to $R^{314}$, $R^{321}$ to $R^{366}$, $R^{371}$ to $R^{378}$, $R^{381}$ to $R^{384}$, $R^{386}$ to $R^{389}$, and $R^{391}$ to $R^{400}$ each independently represent a hydrogen atom or a substituent group; $R^{315}$ represents a hydrogen atom, an aliphatic group, an aromatic group, or a heterocyclic group bound via a carbon atom; $R^{379}$, $R^{380}$, and $R^{385}$ each independently represents a substituent group; $X^{341}$ represents a hydrogen atom, an aliphatic group, an aromatic group, or a heterocyclic group bound via a carbon atom; $n_{379}$, $n_{380}$ and $n_{385}$ each independently represents an integer of from 0 to 4, and when $n_{379}$, $n_{380}$ or $n_{385}$ is 2 or more, a plurality of $R^{379}$s, $R^{380}$s or $R^{385}$s may be the same or different; and groups adjacent to each other may be bound to each other to form a ring.

According to the invention, there can be provided a near-infrared-absorbing material that simultaneously achieves light resistance, near-infrared absorption performance, and less discoloration after light deterioration, as well as a near-infrared-absorbing filter provided with the near-infrared-absorbing material.

All publications, patent applications, and technical standards mentioned in this specification are herein incorporated by reference to the same extent as if each individual publication, patent application, or technical standard was specifically and individually indicated to be incorporated by reference.

It will be obvious to those having skill in the art that many changes may be made in the above-described details of the preferred embodiments of the present invention. The scope of the invention, therefore, should be determined by the following claims.

What is claimed is:

1. A near-infrared-absorbing filter provided with a near-infrared-absorbing material comprising at least one first compound selected from the group consisting of a singlet oxygen scavenger, a radical trapping agent and an antioxidant, the at least one first compound being a combination of a compound represented by the following formula (I-1) and a compound represented by the following formula (I-2), and at least one second compound represented by the following formula (II-2):

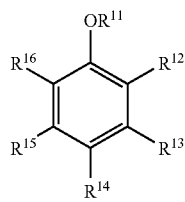

formula (I-1)

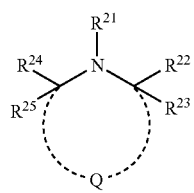

formula (I-2)

wherein $R^{11}$ represents a hydrogen atom, an aliphatic group, an aromatic group, a heterocyclic group bound via a carbon atom, or a hydrolysable protective group; $R^{12}$ to $R^{16}$ each independently represents a hydrogen atom or a substituent group; $R^{11}$ and $R^{12}$, $R^{12}$ and $R^{13}$, $R^{13}$ and $R^{14}$, $R^{14}$ and $R^{15}$, $R^{15}$ and $R^{16}$, and $R^{16}$ and $R^{11}$ may be bound to each other to form a ring; $R^{21}$ represents a hydrogen atom, an aliphatic group, an acyl group, an alkyl or aryl sulfonyl group, an alkyl or aryl sulfinyl group, an oxy radical group or a hydroxyl group; Q represents a nonmetallic atomic group necessary for forming a 5-, 6- or 7-membered ring; $R^{22}$ to $R^{25}$ each independently represents a hydrogen atom, an aliphatic group, an aromatic group, or a heterocyclic group bound via a carbon atom; and $R^{21}$ and $R^{22}$, $R^{22}$ and $R^{23}$, $R^{24}$ and $R^{25}$, and $R^{21}$ and $R^{24}$ may be bound to each other to form a ring;

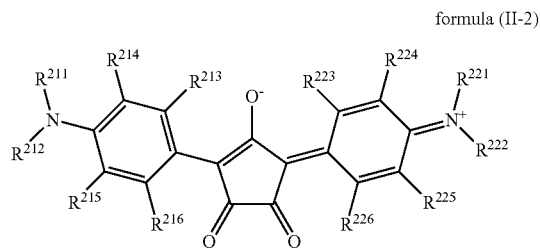

formula (II-2)

wherein $R^{211}$, $R^{212}$, $R^{221}$ and $R^{222}$ each independently represents a hydrogen atom, an aliphatic group, an aromatic, group, or a heterocyclic group bound via a carbon atom; $R^{213}$ to $R^{216}$ and $R^{223}$ to $R^{226}$ each represents a hydrogen atom or a substituent group; and $R^{213}$ and $R^{214}$, $R^{214}$ and $R^{211}$, $R^{211}$ and $R^{212}$, $R^{212}$ and $R^{215}$, $R^{215}$ and $R^{216}$, $R^{223}$ and $R^{224}$, $R^{224}$ and $R^{221}$, $R^{221}$ and $R^{222}$, $R^{222}$ and $R^{225}$, and $R^{225}$ and $R^{226}$ may be bound to each other to form a ring, wherein the total amount of the first compound being a combination of the compound represented by formula (I-1) and the compound represented by formula (I-2) is from 0.1 to 2 moles per mole of the second compound represented by formula (II-2), and the content of the second compound represented by formula (II-2) is from $10^{-4}$% by weight to 3% by weight with respect to the total solid content of the near-infrared-absorbing material.

2. The near-infrared-absorbing filter of claim 1, which further comprises at least one ultraviolet-absorbing compound.

3. The near-infrared-absorbing filter of claim 2, wherein the spectral absorption maximum wavelength, in a range of from 270 to 1600 nm, of the ultraviolet-absorbing compound in solution is 410 nm or less.

4. The near-infrared-absorbing material filter of claim 2, wherein the ultraviolet-absorbing compound is a compound represented by any of the following formulae (III-1) to (III-9):

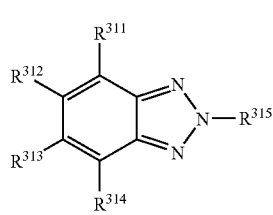

formula (III-1)

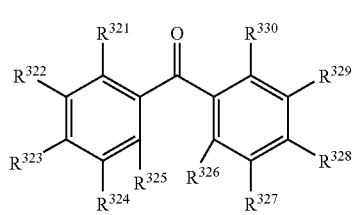

formula (III-2)

-continued

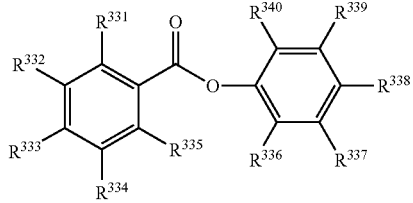
formula (III-3)

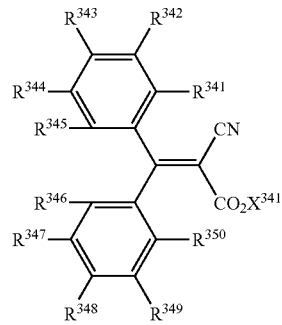
formula (III-4)

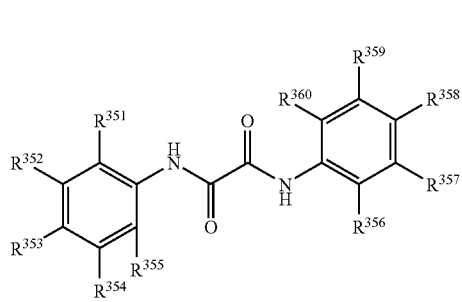
formula (III-5)

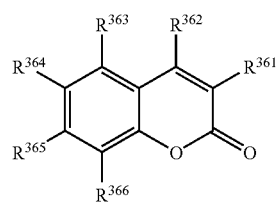
formula (III-6)

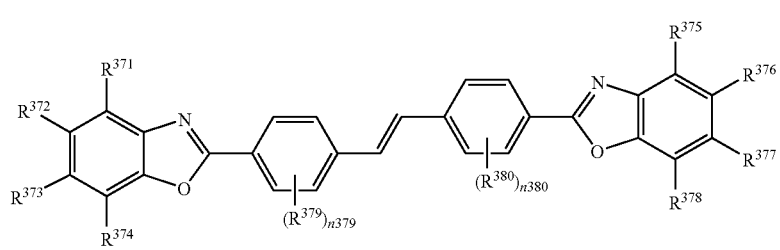
formula (III-7)

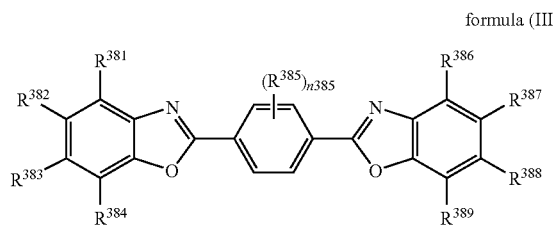
formula (III-8)

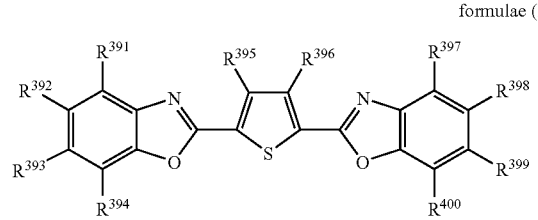
formulae (III-9)

wherein $R^{311}$ to $R^{314}$, $R^{321}$ to $R^{366}$, $R^{371}$ to $R^{378}$, $R^{381}$ to $R^{384}$, $R^{386}$ to $R^{389}$, and $R^{391}$ to $R^{400}$ each independently represents a hydrogen atom or a substituent group; $R^{315}$ represents a hydrogen atom, an aliphatic group, an aromatic group, or a heterocyclic group bound via a carbon atom; $R^{379}$, $R^{380}$ and $R^{385}$ each independently represents a substituent group; $X^{341}$ represents a hydrogen atom, an aliphatic group, an aromatic group, or a heterocyclic group bound via a carbon atom; $n_{379}$, $n_{380}$ and $n_{385}$ each independently represents an integer of from 0 to 4, and when $n_{379}$, $n_{380}$ or $n_{385}$ is 2 or more, a plurality of $R^{379}$s, $R^{380}$s or $R^{385}$s may be the same or different; and groups adjacent to each other may be bound to each other to form a ring.

5. The near-infrared-absorbing material filter of claim 4, which comprises two or more of the ultraviolet-absorbing compound.

6. The near-infrared-absorbing filter of claim 4, wherein the ultraviolet-absorbing compound is a combination of a compound represented by any of formulae (III-1) to (III-3), (III-8) and (III-9).

7. The near-infrared-absorbing filter of claim 2, which comprises two or more of the ultraviolet-absorbing compound.

8. The near-infrared-absorbing filter of claim 1, wherein in formula (II-2), $R^{213}$ and $R^{223}$ each represents a hydrogen atom, $R^{214}$ and $R^{211}$, $R^{215}$ and $R^{212}$, $R^{224}$ and $R^{221}$, $R^{225}$ and $R^{222}$ are alkyl groups bound to each other to form a 5- or 6-membered ring, and $R^{216}$ and $R^{226}$ each represents a hydroxyl group; or $R^{211}$, $R^{212}$, $R^{221}$ and $R^{222}$ each represents an alkyl group, $R^{213}$ to $R^{215}$ and $R^{223}$ to $R^{225}$ each represents a hydrogen atom, and $R^{216}$ and $R^{226}$ each represents a hydroxyl group.

9. The near-infrared-absorbing filter of claim 1, wherein in formula (I-1), $R^{11}$ represents a hydrogen atom and $R^{12}$, $R^{13}$, $R^{15}$ and $R^{16}$ each independently represents a hydrogen atom or a tertiary alkyl group having 3 to 8 carbon atoms.

10. The near-infrared-absorbing filter of claim 1, wherein in formula (I-2), $R^{21}$ represents a hydrogen atom, an alkyl group having 1 to 20 carbon atoms, or an oxy radical, $R^{22}$, $R^{23}$, $R^{24}$ and $R^{25}$ each represents a hydrogen atom or a methyl group, and Q represents a nonmetallic atomic group necessary for forming a 5- to 7-membered ring selected from a carbon atom, a hydrogen atom, and a nitrogen atom.

* * * * *